United States Patent
Roubloff, deceased et al.

[11] 3,886,652
[45] June 3, 1975

[54] TOOL CHANGER MECHANISM

[75] Inventors: Alexander D. Roubloff, deceased, late of West Hartford, Conn.; Adolf E. Peiser, Windsor Locks, Conn.

[73] Assignee: Colt Industries Operating Corp., West Hartford, Conn. 06101

[22] Filed: Oct. 24, 1971

[21] Appl. No.: 299,781

[52] U.S. Cl. ............................... 29/568; 214/1 BD
[51] Int. Cl. ............................................. B23q 3/157
[58] Field of Search .................... 29/568; 214/1 BD

[56] References Cited
UNITED STATES PATENTS

| | | | |
|---|---|---|---|
| 3,256,600 | 6/1966 | Swanson et al. | 29/568 |
| 3,276,116 | 10/1966 | Stark | 29/568 |
| 3,277,569 | 10/1966 | Verhoeven | 29/568 |
| 3,286,344 | 11/1966 | Brainard et al. | 29/568 |
| 3,541,677 | 11/1970 | Fiegler | 29/568 |
| 3,608,185 | 9/1971 | Pfister | 29/568 |
| 3,691,626 | 9/1972 | Mousseau et al. | 29/568 |
| 3,691,655 | 9/1972 | Kurimoto et al. | 29/568 |

FOREIGN PATENTS OR APPLICATIONS

| | | | |
|---|---|---|---|
| 1,235,705 | 3/1967 | Germany | 29/568 |

*Primary Examiner*—J. M. Meister
*Assistant Examiner*—Z. R. Biliusky
*Attorney, Agent, or Firm*—R. W. Luther; Richard A. Dornon

[57] ABSTRACT

A three-axis machine tool, having a vertical slide and a horizontal slide, has a spindle housing mounted upon ways on the vertical slide for horizontal sliding movement. The spindle housing includes a spindle. A tool changer assembly is fixedly mounted upon the vertical slide above the spindle housing such that the weight of the tool changer assembly is not carried by the spindle housing. The tool changer assembly is constituted by a tool storage magazine and a tool transfer mechanism. The storage magazine has an endless track upon which a plurality of tool carriers are mounted for vertical storage of a plurality of tools. A segment of the track at a tool transfer station is pivotable so that a selected tool carrier at the transfer station may be lowered to a tool transfer position to discharge a new tool or to receive a used tool. The tool transfer mechanism includes a tool transfer arm mounted below the magazine for rotational movement about an axis parallel to that of the spindle and that of a tool in the transfer position. The transfer arm is also capable of movement axially along its axis of rotation between an inner position and an outer position such that a tool may be removed from or replaced in a tool carrier in the transfer position, and a tool may be removed from or placed in the spindle. The transfer arm has first and second selectively extensible and retractable clamping devices arranged perpendicularly with respect to each other. The clamping devices are adapted to grasp or release a tool in the transfer position or in the spindle. The tool transfer mechanism is constructed and arranged to rotate the transfer arm in a bidirectional manner between four circumferentially spaced index positions which define predetermined angles between adjacent positions. In the first index position, the first clamping device retains a new tool to be transferred to the spindle. In the second index position, the second clamping device withdraws the used tool from the spindle. In the third index position, the new tool is inserted into the spindle. In the fourth index position, the used tool is transferred to an empty tool carrier. This sequence is again repeated in the opposite direction when another tool changing operation is commanded. The transfer arm is positioned on the transfer mechanism so that no interference will be encountered with the spindle housing when the arm occupies the first and fourth index positions.

24 Claims, 41 Drawing Figures

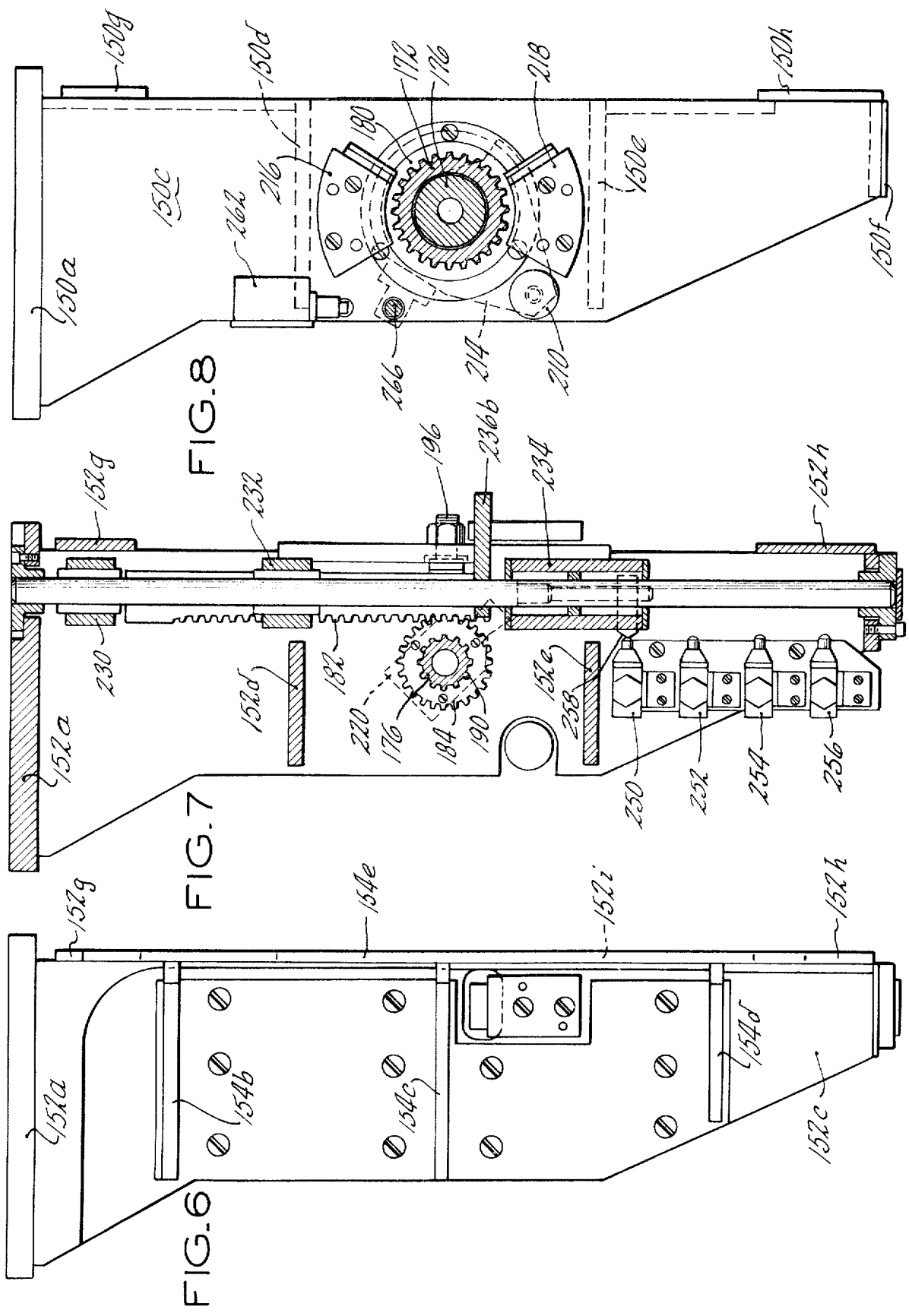

FIG.14A
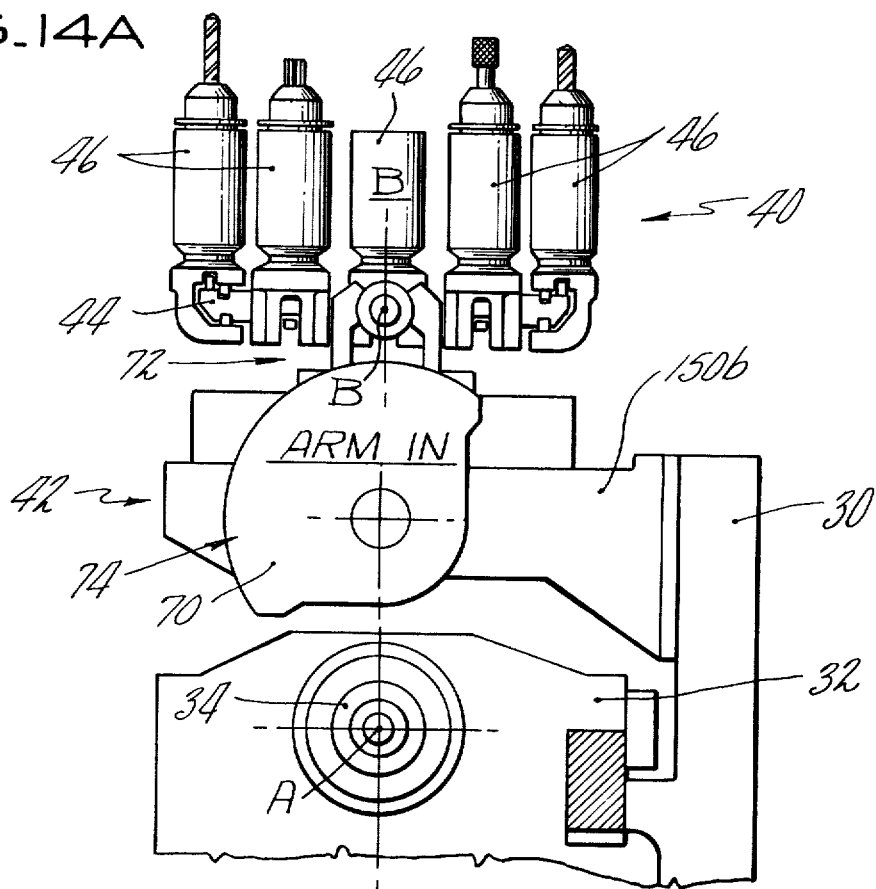
FIG.14B
*MAGAZINE SEARCHING FOR TOOL CARRIER 'A'*
FIG.14C
FIG.14D
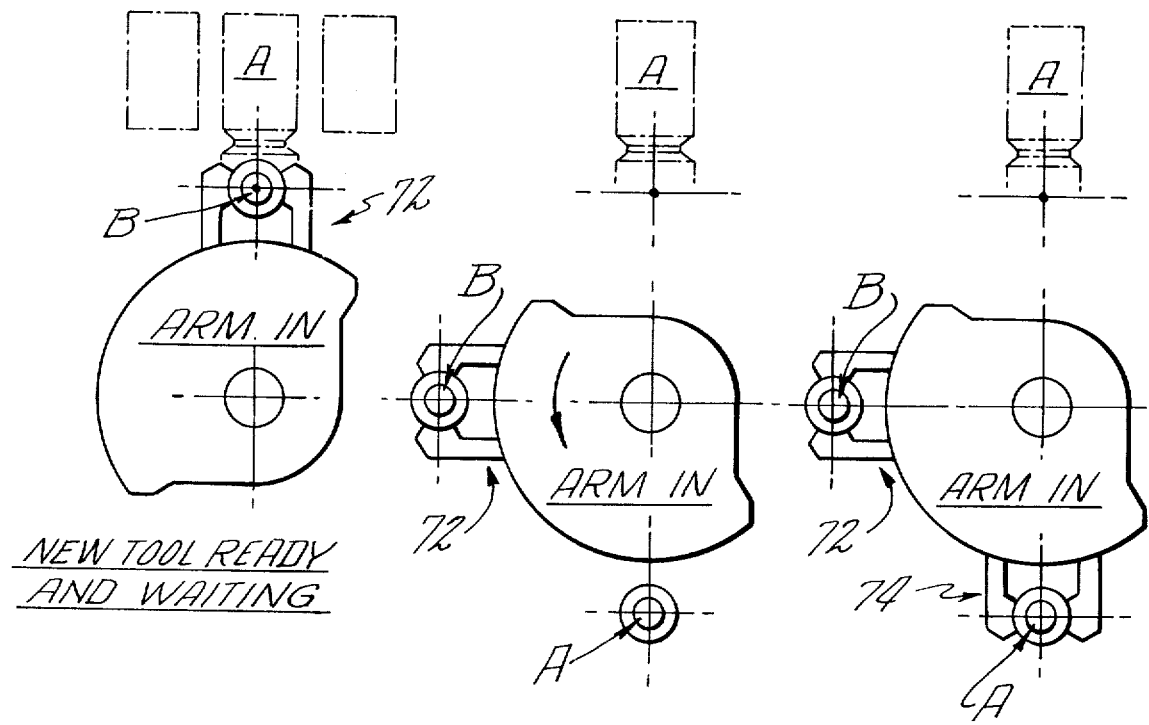
*NEW TOOL READY AND WAITING*

FIG.14E      FIG.14F      FIG.14G
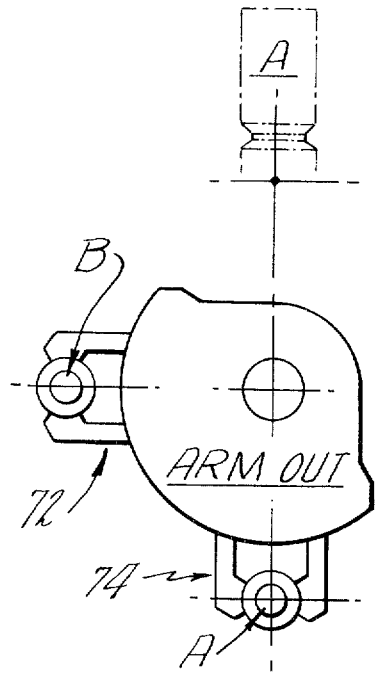 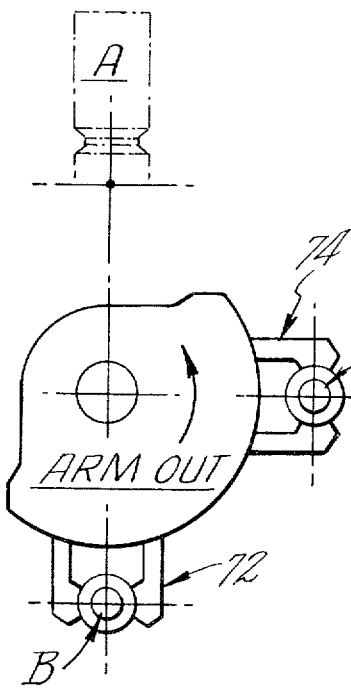 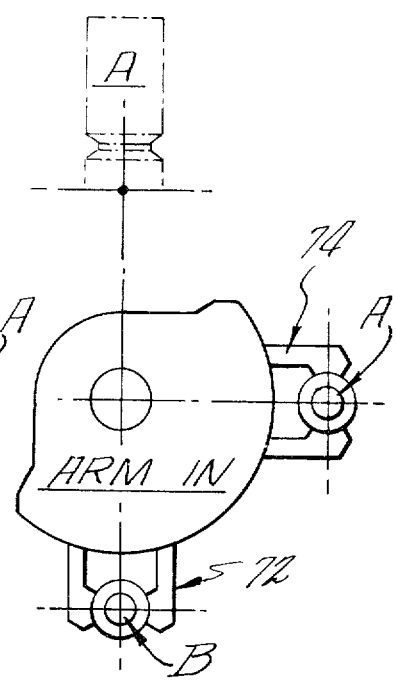
FIG.14H      FIG.14I      FIG.14J
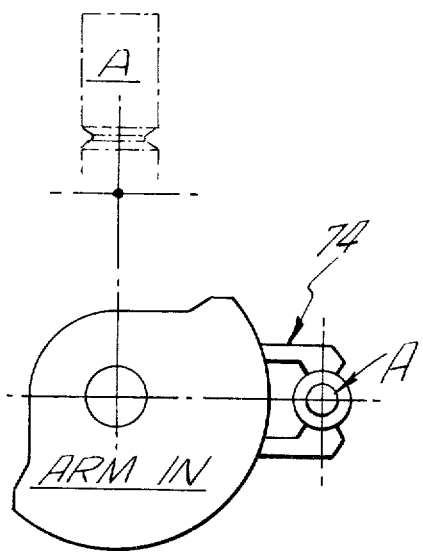 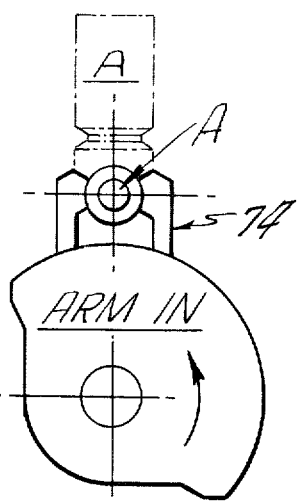 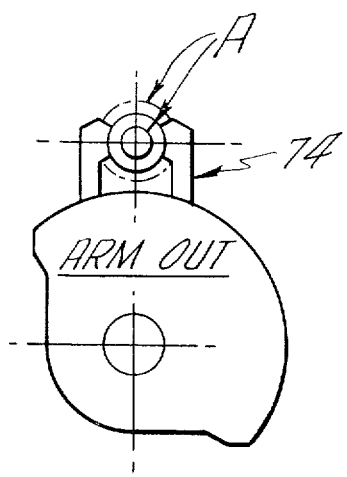

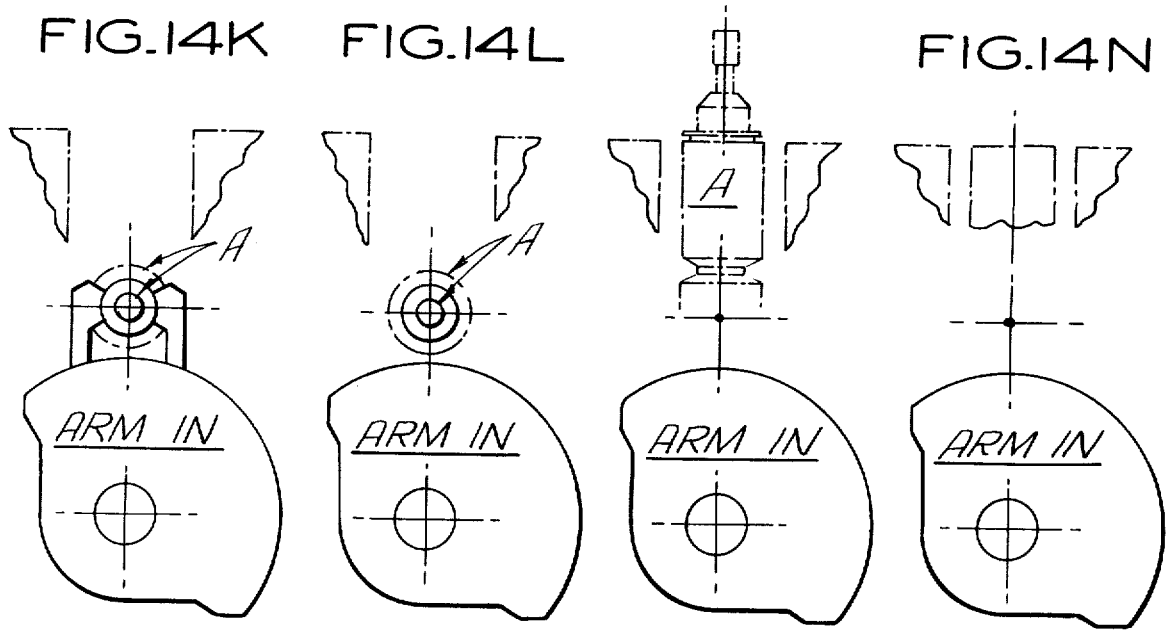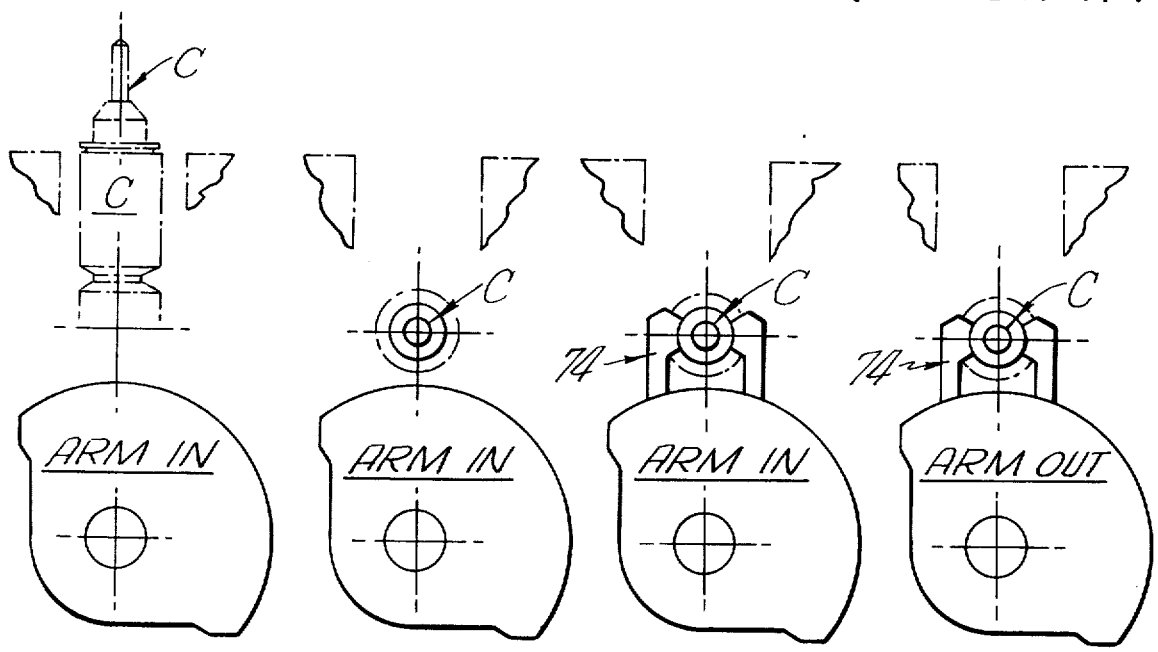

FIG.14S
FIG.15A
FIG.15B
_MAGAZINE SEARCHING_
_FOR TOOL CARRIER 'B'_
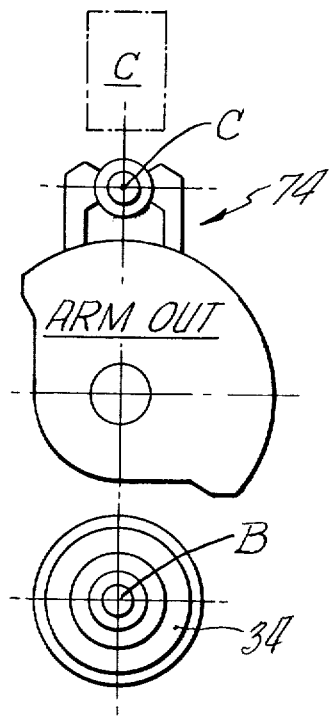
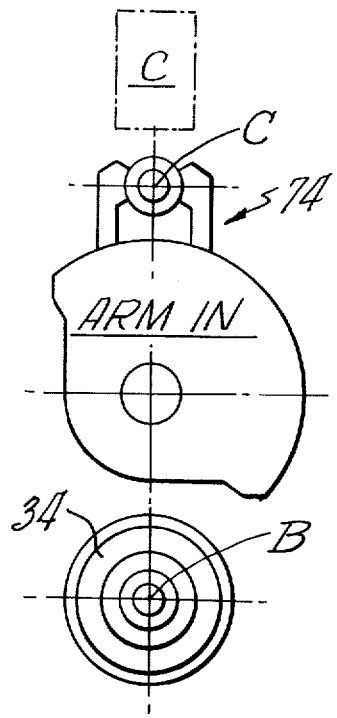
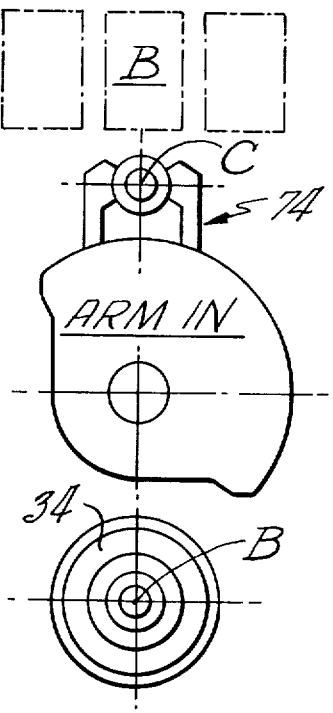
FIG.15C
FIG.15D
FIG.15E
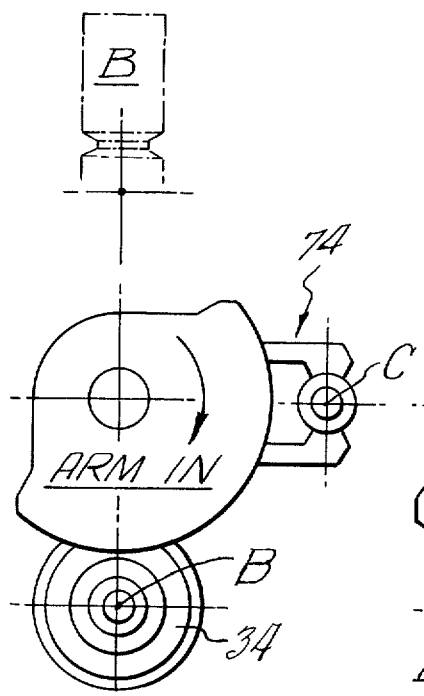
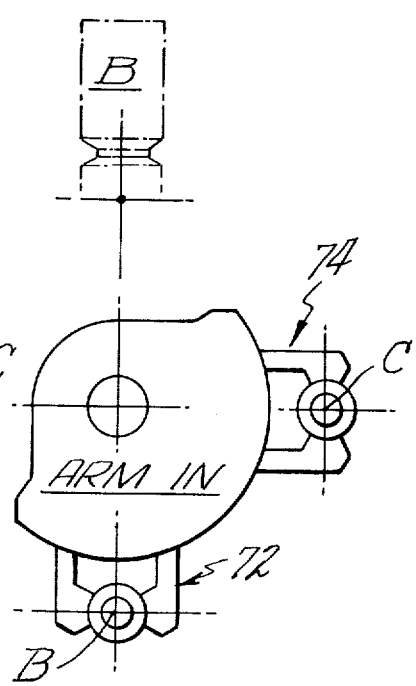
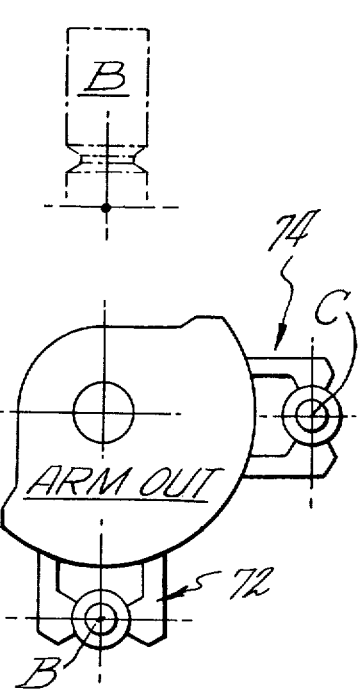

3,886,652

TOOL CHANGER MECHANISM

BACKGROUND OF THE INVENTION

This invention relates to an automatic tool changer for a machine tool having a tool storage magazine which contains a plurality of different tools adapted to be selectively removed therefrom and inserted into a spindle.

Various types of tool changers are known in the art. For example, in one well-known type, a plurality of tools are carried in an indexable magazine which is shifted to a position proximate the spindle where the old tool may be removed therefrom and a new tool subsequently inserted therein. Two obvious disadvantages inherent in this type of tool changer are that the search for the new tool to be inserted into the spindle must be conducted while the spindle is idling, and that the storage capacity of the magazine is somewhat limited. However, this type of tool changer is advantageous in that the magazine does not interfere with machining operations. In another type of tool changer, the magazine is mounted proximate the spindle upon the machine head or spindle housing whereby removal of old tools from the spindle and insertion of new tools therein can be effected by a simple intermediate transfer mechanism. An inherent deficiency in this approach is that the magazine is closely adjacent the spindle and thus must be limited in capacity so as not to unduly interfere with machining operations. In yet another type of tool changer, the magazine is remotely located from the head, thereby enhancing the storage capability of the magazine. In order to transfer tools to and from the magazine, an intermediate transfer mechanism is required. One problem with this latter type of tool changer is that the intermediate transfer mechanism must undergo relatively extensive and time-consuming movements in order to transfer tools to and from the spindle.

Manifestly, it would be highly desirable to have a tool changer which has a large storage capacity, which does not require a substantial transfer mechanism, and which does not interfere with machining operations. It would also be desirable if the operation of such a tool changer resulted in a minimal lost machining time.

SUMMARY OF THE INVENTION

The invention provides a tool changing method and arrangement for a machine tool having a spindle housing which embodies a spindle. In accordance with the arrangement of the invention, a tool changer, which includes a storage magazine and a transfer mechanism, is mounted upon the machine tool such that it is spaced from, but adjacent to, the head. The transfer mechanism incorporates a transfer arm having selectively operable clamping devices which are adapted to transfer new tools from a transfer position in the magazine to the spindle, and to return used tools in the spindle to the transfer position in the magazine. The transfer arm of the transfer mechanism is rotatable about an axis parallel to that of the spindle through four index positions and is axially movable along the axis between inner and outer positions. The inward and outward movements of the transfer arm are employed to remove and replace tools in the magazine, and to remove and replace tools in the spindle. In the first index position, the transfer arm secures a new tool from the magazine. In the second index position, the transfer arm removes a used tool from the spindle. In the third index position, the new tool, which was previously removed from the magazine, is inserted into the spindle. In the fourth index position, the used tool removed from the spindle is replaced in the magazine.

Since the magazine is not carried by the head, a weight penalty is not imposed thereupon and there is no interference with machining operations of the head. Also, because the magazine is spaced from the head, its capacity is substantially unlimited. However, because the magazine, although spaced from, is adjacent the head, only a simple intermediate transfer mechanism, viz: the rotatable transfer arm, is necessitated. In addition, only small movements of the intermediate transfer mechanism are needed because of the proximity between the tool storage magazine and the tool operator, thereby expediting a tool change.

With a tool changing method and arrangement according to the invention, a search may be instituted for the old tool carrier in the magazine while the transfer arm, which is awaiting a tool change, retains a new tool. Similarly, the search for a subsequent new tool may be conducted (after return of a used tool) before the tool changing operation is commenced. Also, a transfer mechanism according to the invention permits machining operations to go forward when a new tool is being received from the magazine or an old tool is being tranferred thereto.

Still another feature of the invention contemplates the use of a single transfer position, thereby simplifying the indexing of the magazine and the control of the transfer mechanism. A transfer arm according to the invention thus readily lends itself to bidirectional operation which may be utilized to further expedite the tool changing process.

It should be noted that a tool changing method and arrangement according to the invention is particularly well-suited for machine tools, wherein the head is horizontally movable on a vertical slide. For such an arrangement, the tool changer may be mounted just above the spindle housing on the vertical slide in such a manner that there will be no interference with machining operations, nor any weight burden imposed upon the spindle housing. Additionally, in such an arrangement, the tool storage magazine may comprise an endless track which incorporates a pivotable segment whereby the tool carriers and adapters may be lowered from a vertical position to a horizontal position or tool transfer position. With such a prior art magazine, loading and unloading of tools in the respective tool carriers is greatly simplified. An additional advantage of utilizing such a magazine is that the tool carriers may be individually coded whereby a tool may be called up in or out of sequence. Also, it will be appreciated that coded tool carriers obviate the need for coded tool adapters which are significantly more expensive than uncoded tool adapters.

It is a primary object of the invention to provide a tool changer for a machine tool, wherein the tool changer has substantial capacity and does not require extensive movements of an intermediate transfer mechanism, nor interfere with movements of the head.

Another object is to provide a tool changer for a machine tool, wherein the tool changer has a relatively large storage capacity and is mounted proximate the head such that there is no interference with the machining operations therof.

Yet another object is to provide a tool changer which performs tool changing operations so as to engender a minimum of lost machining time.

A still further object of the invention is to provide a tool changer having a transfer arm with selectively operable clamping devices.

An even further object is to provide a method of changing tools.

These and other objects and advantages of the invention will become more readily apparent from the following detailed description taken in conjunction with the accompanying drawings.

BRIEF DESCRIPTION OF THE DRAWINGS

FIG. 6 is a rear view of the transfer mechanism taken along the line 6—6 of FIG. 5. FIGS. 7 and 8 are sectional views of the transfer mechanism taken along the lines 7—7 and 8—8 of FIG. 5, respectively.

FIGS. 14A through 14S and 15A through 15I are diagrammatic illustrations showing the sequential operations performed by the transfer arm.

DETAILED DESCRIPTION OF PREFERRED EMBODIMENT

Figure 1:
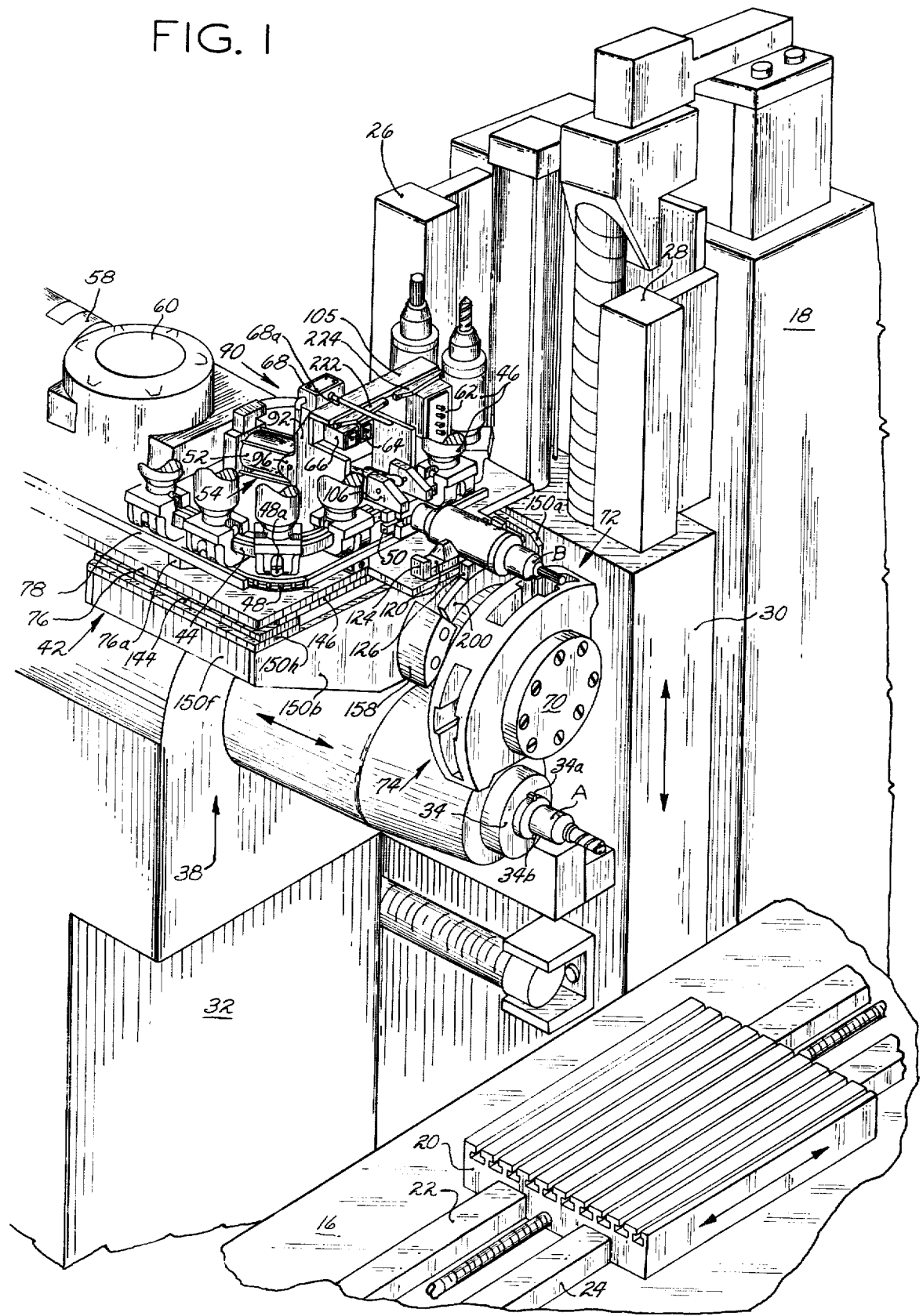
FIG. 1 is a perspective view of a three-axis machine tool incorporating a tool changer according to the invention and adapted to practice the method of the invention.

With reference to FIG. 1, there is shown in perspective a three-axis machine tool having a frame comprising a base 16 and a vertical column 18. A horizontal slide 20 is secured to the base 16 upon ways 22 and 24 which guide the sliding movement thereof. A workpiece is adapted to be supported upon the slide 20. Secured to the vertical column 18 are vertically extending ways 26 and 28 which guide the vertical sliding movement of vertical slide 30. Mounted upon the exposed face of the vertical slide 30 upon horizontal, vertically spaced ways is a spindle housing or head 32 adapted to be driven horizontally along the horizontal ways relative to the vertical slide 30. The spindle housing 32 is provided with a tool operator in the form of a rotating spindle 34. The spindle, which includes keys 34a and 34b, is adapted to accommodate and secure a tool for drilling, reaming, tapping or other operations. In FIG. 1, a drill, designated A, is shown retained in the spindle 34 for purposes of illustration. For changing the tool in the spindle 34, a tool changer assembly, generally designated at 38, is rigidly secured to the exposed face of vertical slide 30 proximate to and above the head 32. The tool changer assembly 38 laterally extends from the slide 30 in a manner similar to that of the spindle housing 32, except that the tool changer assembly is not capable of relative movement with respect to slide 30, as is the spindle housing 32.

The tool changer assembly 38 comprises an upper tool storage magazine, generally shown at 40, and a lower tool transfer mechanism, generally indicated at 42. As is hereinafter described in more detail, the tool storage magazine 40 is constituted by an endless track 44 upon which a plurality of tool carriers or holders 46 are driven by a chain 48. A segment 50 of the track 44 is pivoted to adjacent sections of track 44 so that a tool carrier 46 on the track 50 may be moved between a raised position, that is a vertical position, and a lowered or tool transfer position, as depicted in FIG. 1. Pivoting of the track section 50 through a 90° angle is accomplished by means of a piston assembly 52 which is supported on a bracket 54. The chain 48, which impels the carriers about the track 44, is, in turn, driven by a DC motor 58 via a drive mechanism 60. The tool carriers 46 are individually coded by means hereinafter described, so that the location of a particular tool carrier, adjacent the transfer station, is sensed by a bank of limit switches 62. Two other limit switches 64 and 66 are secured to the bracket 54. Limit switch 64 senses the proximity of a selected tool carrier to the transfer station, which is the center of track segment 50, and generates a signal which causes a reduction in the speed of DC motor 58. Limit switch 66 senses when the selected tool carrier has arrived at the transfer station and generates a signal which results in a termination in the movement of the drive chain 48. Yet another limit switch 68, having an elongated flexible probe 68a, is attached to bracket 54 to provide respective signals indicative of the condition of the tool carriers, i.e., whether they are empty or contain tools.

The heart of the transfer mechanism 42 is a tool transfer arm 70 which embodies first and second clamping devices, generally designated 72 and 74, which are selectively extensible and retractable in mutually transverse directions. The transfer arm 70 is mounted so as to be rotatable about an axis which lies parallel to that of a tool in the tool transfer position, and that of the tool operator, as constituted by spindle 34. The transfer arm 70 is also axially movable along its axis of rotation between an inner and an outer position. Outward movement of the transfer arm 70 from its inner position may effect either removal of a tool from a tool carrier, or removal of a used tool from the spindle 34. Conversely, inward movement of the transfer arm 70 may effect an insertion of a new tool in spindle 34, or replacement of a used tool in its empty carrier. It should be noted at this point that the tool transfer arm 70 is rotatable through four index positions which embrace an angle of 270°. Each index position, numbering one through four, is spaced 90° from the preceding index position, as is subsequently discussed in detail. In its preferred form, the tool transfer arm 70 is bidirectionally rotatable such that the fourth index position for one tool changing operation becomes the initial index position for the next tool changing operation. This feature makes the transfer arm 70 well-suited to a simple hydraulic actuation system.

In order to more fully appreciate the ensuing discussion of the details of the tool changer assembly 38, it would be profitable at this stage to briefly describe the operation of the tool transfer arm 70. In the first index position (the position of FIGS. 1 and 3), a new tool is removed from a selected tool carrier in the tool transfer or lowered position by an outward movement of the transfer arm with the new tool retained by clamping device 72. After withdrawal of the new tool, its carrier assumes its normal vertical position and the transfer arm moves inwardly to its inner position. The transfer arm is now ready to initiate a tool changing operation upon command. It is important to appreciate the fact that the above-described removal of the new tool from the selected carrier will normally be effected while the spindle is performing a machining operation upon a workpiece. The transfer arm may now be rotated to the second index position (counterclockwise rotation), wherein clamping device 74 secures the used tool in the spindle, and the transfer arm 70 then moves to its outer position, thereby extracting the used tool. Subsequently, the transfer arm 70 rotates to the third index position in which the new tool is inserted in the spindle by an inward movement of the transfer arm 70. Clamping device 72 is retracted and the transfer arm is then rotated to the fourth index position. In the forth index position, while machining operations resume, the used tool is returned to the magazine by outward and inward movements of the transfer arm 70. In the next tool changing operation, the tool transfer arm rotates through the index positions in a clockwise manner. It should be apparent that before a tool changing operation can be commenced, the spindle housing 32 must be positioned in a predetermined location on vertical slide 26 such that the clamping devices 72 and 74 of the transfer arm 70 may grasp a tool held in the spindle 34.

Figure 2:
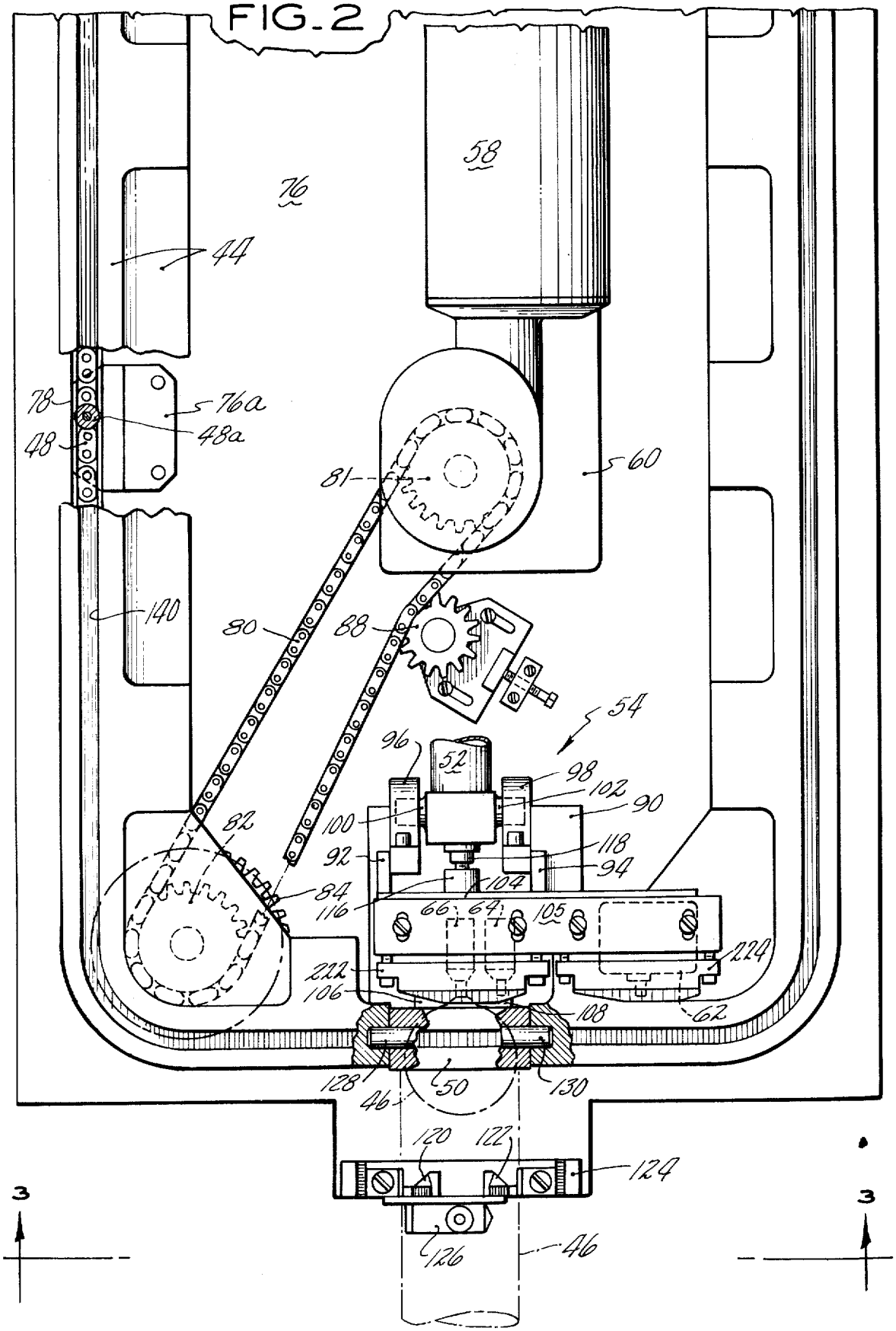
FIG. 2 is a plan view of the tool storage magazine of FIG. 1.

Referring now to FIG. 2 in conjunction with FIG. 1, the tool storage magazine 40 is mounted upon a horizontal supporting plate 76. A plurality of vertically extending supporting brackets 76a are bolted to the supporting plate 76 for carrying the track 44 and a chain guide 78 which guides and supports the movement of the drive chain 48. The drive chain 48 carries a plurality of upstanding cylindrical structures 48a which are rotatable about the point at which they are secured to the chain 48. The structures 48a are equally spaced along the length of the drive chain 48, and each is adapted to provide a driving impetus to a tool carrier, as will be subsequently explained. A power chain 80 drivingly interconnects a power sprocket 81 to a small diameter sprocket 82 which is mounted on the plate 76 for rotation with an upper sprocket 84 integral therewith. The teeth of the sprocket 84 engage the chain 48 to impart movement thereto as sprocket 82 is driven by the power chain 80. Another sprocket 86 is located at the right front of the magazine and engages the chain 48 in a manner similar to that of sprocket 84. The rear of the magazine (not shown) is also provided with two sprockets which are located in positions corresponding to those of sprockets 84 and 86. In order to take up any slack in the power chain 80, an adjustable idler sprocket 88 is mounted upon the plate for movement toward and away from the chain.

The manner in which the piston assembly 52 is mounted upon the bracket 54 and its relationship to the pivotable track segment 50 can best be understood by reference to FIGS. 1 through 4. The bracket 54 has a base 90, from which extend vertical sides 92 and 94. Attached to the vertical sides 92 and 94 of bracket 54 are supporting blocks 96 and 98, respectively. The supporting blocks 96 and 98 have aligned apertures therein which respectively receive and support laterally extending shafts 100 and 102 integral with and extending from the piston assembly 52. The piston assembly 52 is thus free to pivot about the axis of shafts 100 and 102 when a tool carrier is raised or lowered. The vertical sides 92 and 94 also provide support for a laterally extending vertical plate 104, which functions as a mounting structure for limit switches 64, 66 and 68 and for a horizontal upper plate 105, the function of which is set forth hereinafter.

The track segment 50 comprises a bifurcated extension rigidly secured thereto which defines legs 106 and 108. A shaft 110, carried by the legs 106 and 108, passes through an aperture in a link 112, which has a threaded extremity 114 threadably inserted into a threaded coupler 116. The coupler 116 is also connected to a threaded end portion (not shown) of a shaft 118 which is connected to the piston of piston assembly 52. The coupler 116 permits adjustment of the connection between the shaft 118 and the link 114 to assure that the track segment 50 is pivoted through a precise angle, whereby the selected tool carrier will be precisely positioned in the transfer position.

A pair of tapered guide lugs 120 and 122 are secured to the front upper surface of the plate 76 by an intermediate support 124, the lugs being respectively bolted thereto. The function of the guide lugs 120 and 122 is to provide support for a tool holder in the tool transfer position and to guide the tool holder into this position should it not be exactly centered on the track segment 50 when the track segment is pivoted. Positioned immediately in front of the support 124, intermediate the lugs 120 and 122, is a limit switch 126 which is secured to the support 124. The limit switch 126 senses when a tool carrier attains the lowered or tool transfer position.

Figure 3:
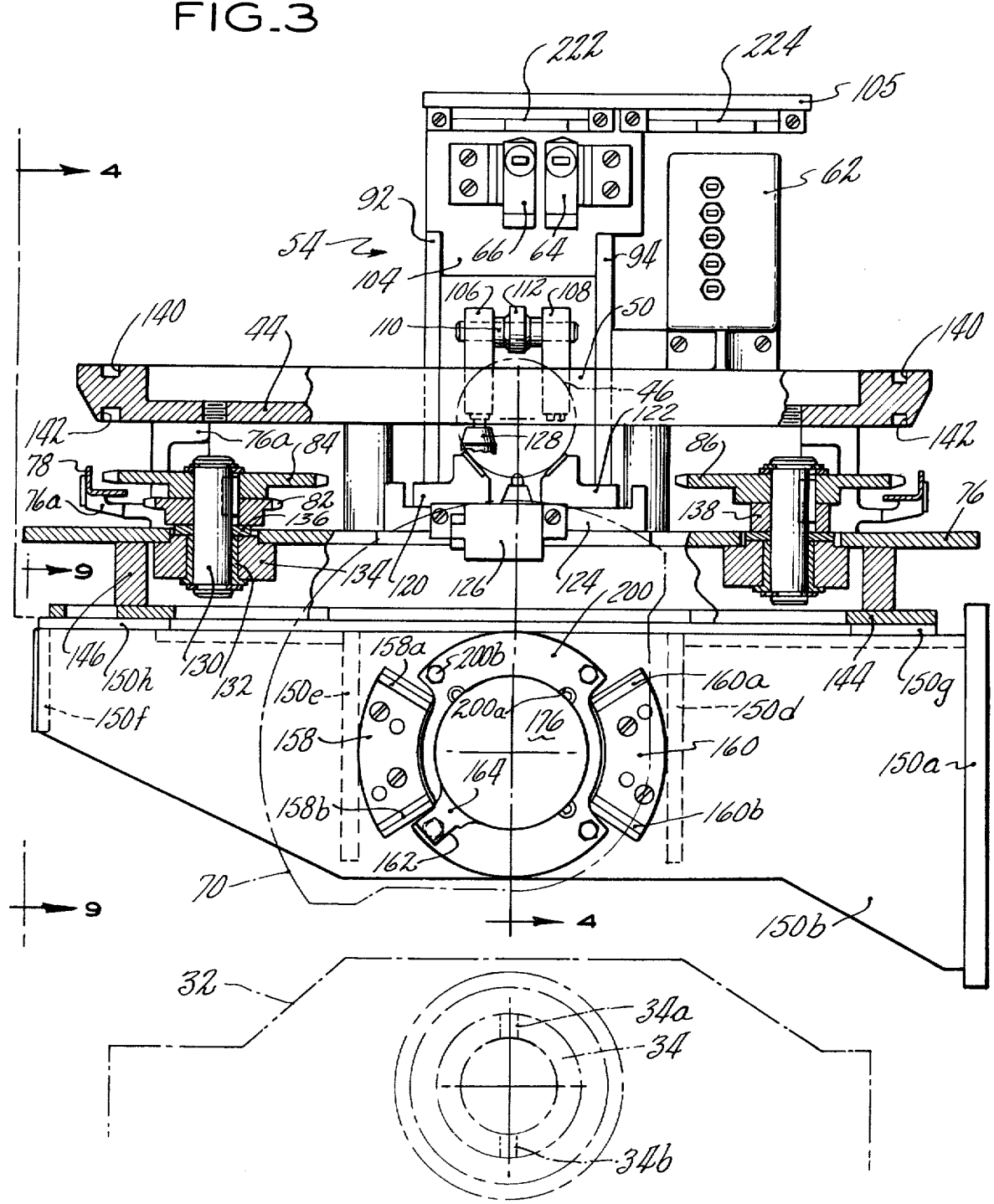
FIG. 3 is a frontal view, partly in section, of the tool changer and the spindle housing taken along the line 3—3 of FIG. 2.

As shown in FIG. 2, the track segment 50 is mounted for pivoting movement about its axis by means of pins 128 and 130, the pins being inserted into cavities in the adjacent track. It should be apparent that an extension of the piston of piston assembly 52 exerts a force on the shaft 110, thereby producing a pivoting of the track segment 50 by virtue of its interconnection with shaft 110. In this regard, it should be noted that the shaft 118, coupler 116 and link 114 always remain in alignment since the piston assembly 52 is permitted to pivot to accommodate different vertical positions of link 112. Referring to FIG. 3 together with FIG. 4, yet another limit switch 128 is secured to the base 90 for sensing when a tool carrier is in the raised or normal position, that is, when the piston of piston assembly 52 is fully retracted.

The details of the sprocket construction are shown in FIG. 3. The front left sprockets 82 and 84 are both keyed to shaft 130 in a coaxial relationship, with the lower surface of sprocket 84 resting upon the upper surface of sprocket 82. The lower portion of shaft 130 is surrounded by a sleeve 132 which, in turn, carries a support ring 134 secured to the plate 76. The sprocket 82 and the support ring 134 abut the opposite sides of a spacer 136, coaxially arranged with respect to the shaft 130. The right front sprocket 86 is identical in construction to the left front sprocket, with the exception that the lower sprocket is replaced by a spacer 138. The two rear sprockets (not shown) are identical in construction to the right front sprocket.

Directing attention momentarily to the track 44, it can be seen that the track comprises an upper groove 140 and a lower groove 142, the grooves being adapted to receive cam followers 46k and 46L on the tool carriers. Below the plate 76 is a supporting member 144 which is spaced therefrom by vertical struts 146, the supporting member 144 defining the lower most portion of the magazine 40.

Figure 4:
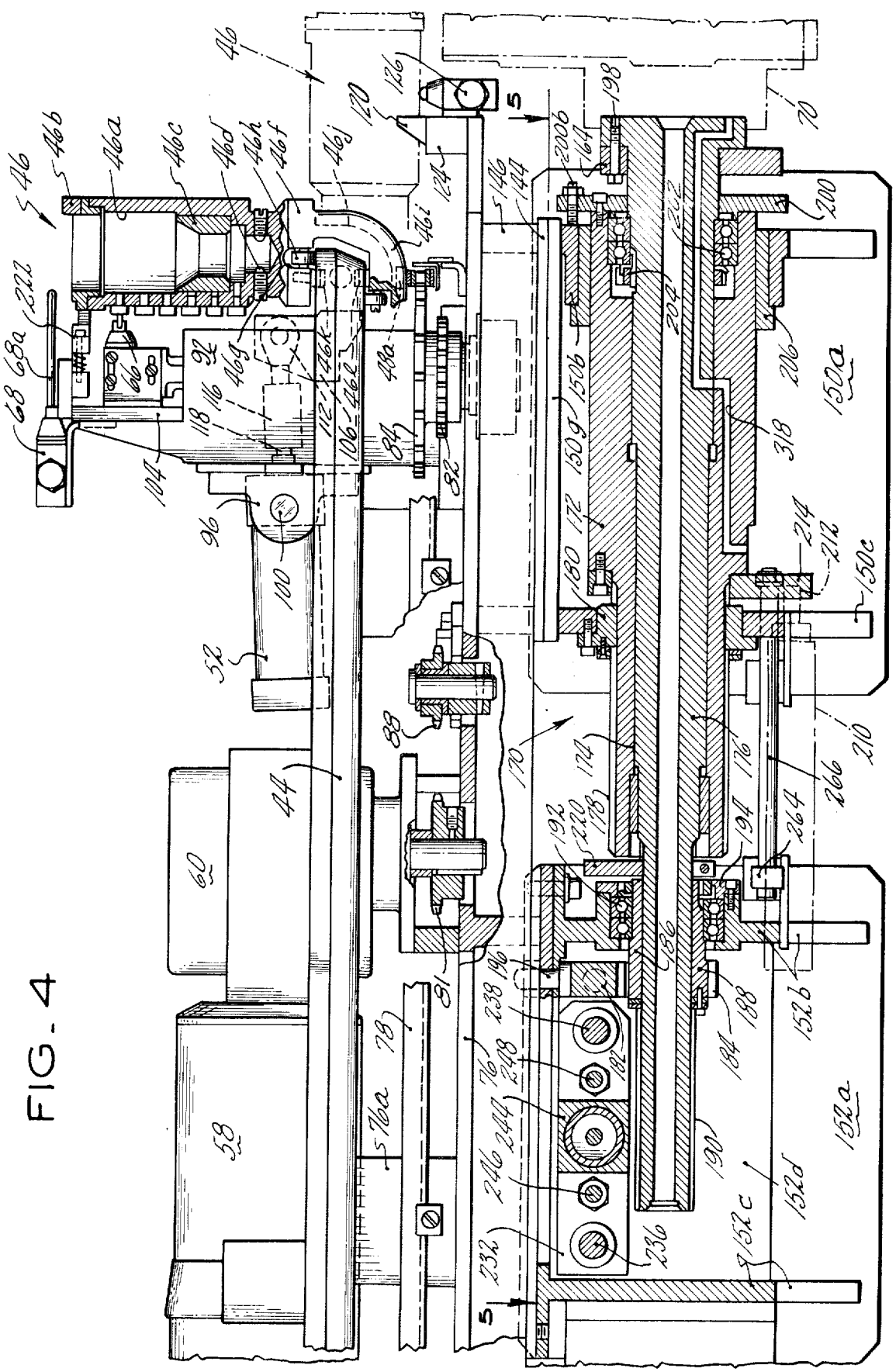
FIG. 4 is a fragmentary, longitudinal view of the tool changer, partly in section, taken along the line 4—4 of FIG. 3.
Figure 5:
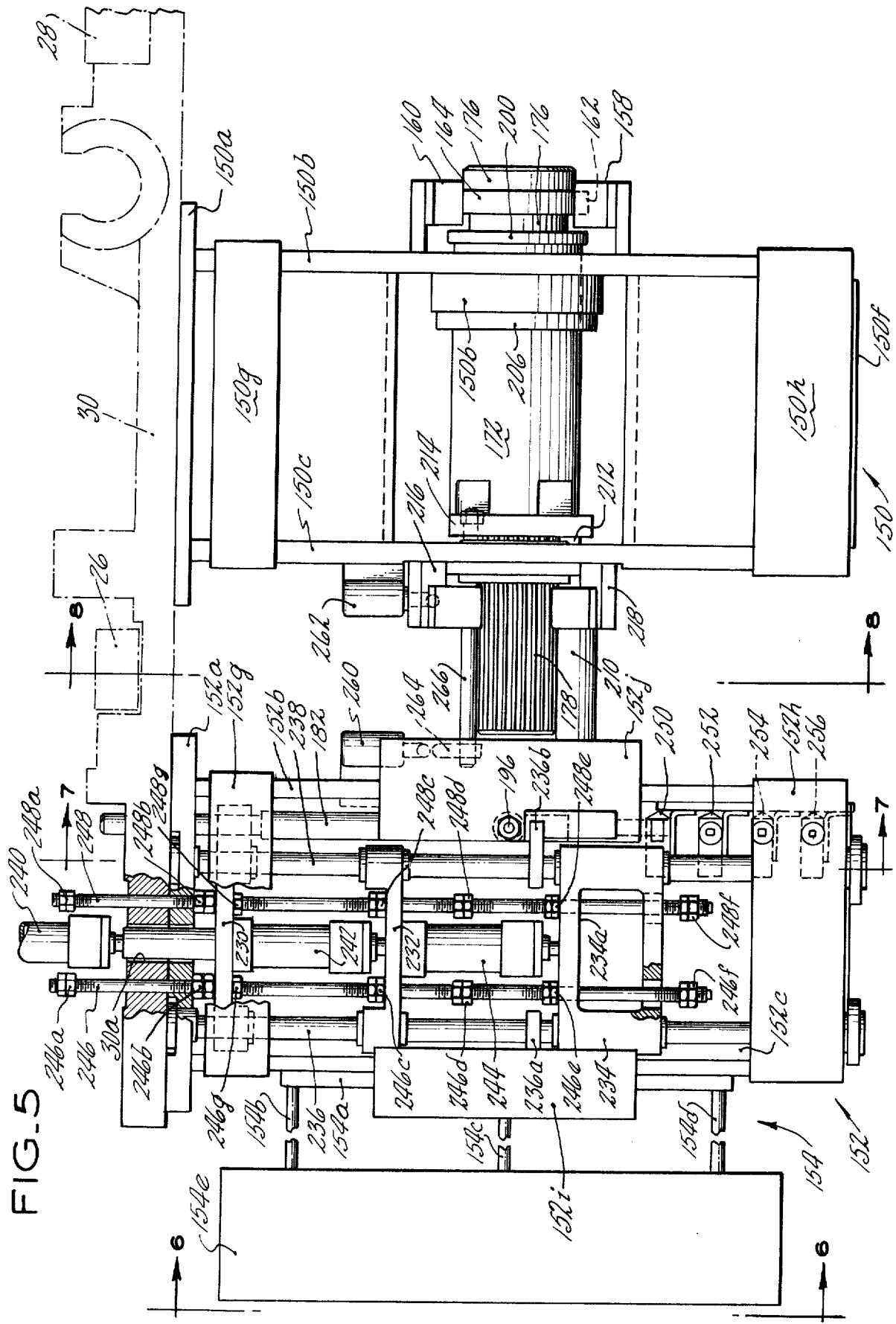
FIG. 5 has a plan view of the transfer mechanism, per se, taken along the line 5—5 of FIG. 4.

The tool changer assembly 38 is rigidly mounted to the slide 30 by means of its front main supporting structure, generally shown at 150, and its rear main supporting structure, generally shown at 152, the supporting structures 150 and 152 being best shown in FIGS. 3, 4 and 5, Each of the main supporting structures 150 and 152 extend in a cantilever fashion from the exposed surface of the vertical slide 30. The main front supporting structure 150 is formed by a vertical mounting plate 150a which is bolted to the vertical slide 26 and two vertical cantilever beams 150b and 150c welded to the plate 150a. The beams 150b and 150c are also welded to vertical webs 150d, 150e and 150f which impart structural rigidity to the main supporting structure 150. The corresponding components of main supporting structure 152, which is essentially similar to main supporting structure 150, are designated 152a through 152f. The main supporting structure 150 is overlaid with plates 150g and 150h. Similarly, main supporting structure 152 is overlaid with plates 152g and 152h, and additionally, plates 152i and 152j. Secured to the rear of main supporting structure 152 is a bracket, shown generally at 154, which comprises a vertical plate 154a, bolted to beam 152c, and a plurality of longitudinally extending beams 154b, 154c and 154d which extend rearwardly therefrom and carry a plate 154e. The plates 150g, 150h, 152g, 152h, 152i, 152j and 154e define a platform upon which the supporting member 144 of the magazine 40 is mounted. Hence, the total load of the tool changer assembly is transmitted to the vertical slide 26 via the vertical plates 150a and 152a of the main supporting structures 150 and 152, respectively.

Secured to the front vertical surface of beam 150b are two symmetrically disposed arcuate stops 158 and 160. The stop 160 has, on its upper and lower surfaces, a pair of stop abutments 160a and 160b for contacting a projection 162 of an index plate (FIG. 4) 164 as the transfer arm 70 assumes an index position. Stop 158 is similarly provided with a pair of stop abutments 158a and 158b which are also adapted to contact the projection 162.

Turning now to FIG. 4, wherein the components of the transfer mechanism 42 which displace the transfer arm 70 inwardly and outwardly may best be appreciated. A shaft assembly, generally designated 170, produces the aforementioned rotational and axial displacements of the transfer arm 70 to which it is secured. Shaft assembly 170 comprises a hollow outer shaft 172 having a longitudinal passageway 174 defined therein. An inner shaft 176 is coaxially mounted within the passage 174 for rotation relative to the outer shaft 172 to produce rotation of the transfer arm 70 between the index positions. The outer shaft 172 and the inner shaft 176 of shaft assembly 170 are adapted to move in unison when the transfer arm is displaced outwardly or displaced inwardly.

The rear portion of the outer shaft 172 has a plurality of axially extending external splines 178 which engage and mate with an internally splined adapter 180 which is connected to the beam 150c. Hence, the adapter 180 prevents rotation of the outer shaft 172 while permitting axial movement thereof. Rotational movement of the inner shaft 176 relative to the outer shaft 172 is accomplished by utilization of a rack 182, which meshes with teeth 184 of a pinion 186. The internal surface 188 of the pinion 186 is splined, as is the adapter 180, to engage splines 190 on the rear of the inner shaft 176. Hence, during axial movement of the shaft assembly 170, the inner shaft 176 slides through the pinion 186. However, movement of the rack 182 will produce a rotation of the pinion 188 and a resulting rotation of the inner shaft 176 by virtue of the splined interconnection therebetween. The pinion 186 is journaled within an axial passage extending through the beam 152b by ball bearing 192, secured in place by a bearing cap 194 which is connected to the beam 152b. The teeth of the rack 182 are maintained in meshing engagement with the teeth 184 of the pinion 186 by means of a retainer 196. The structure which produces movement of the rack 182 to bidirectionally rotate the transfer arm 70 between its four index positions comprises a piston assembly arrangement discussed hereinafter.

Turning now to the front of the transfer mechanism (FIGS. 3 and 4), the securing of the index plate 164 to the rotatable inner shaft 176 is effected by attaching the plate 164 to the left surface of an enlarged diameter portion of the shaft 176 by a plurality of bolts 198. It will thus be appreciated that the plate 164 is fixedly secured to the inner shaft 176 and hence, undergoes the same axial movements and rotational displacements. A bearing retainer 200, which surrounds the inner shaft 176, is fixedly connected to the outer shaft 172 by a plurality of bolts 200a. Hence, the bearing retainer 200 is movable with the shaft 172 which, it will be remembered, only moves forwardly and rearwardly along its axis. A ball bearing 202 is also provided on the front portion of the transfer mechanism to insure the free rotation of inner shaft 176 relative to outer shaft 172. This bearing is contained between bearing retainer 200 and a ball bearing nut 204. The axial movement of the shaft assembly 170 is also guided, adjacent the forward end thereof, by the provision of a bushing 206, interposed between the outer shaft 172 and beam 150b. In order to axially displace the shaft assembly 170, a piston assembly, shown in phantom at 210, has a shaft 212 connected to a collar 214 which, in turn, is fastened to the outer shaft 172. In order to vary the inner position of the shaft assembly 170, retainer 200 is provided with a plurality of adjusting screws 200b which limit the inward movement of the transfer arm 70 by contacting beam 150b.

As can be more fully appreciated from references to FIGS. 5 and 8, together with the succeeding views, a pair of stops 216 and 218 are secured to the beam 150c in the manner which the stops 158 and 160 are secured to beam 150b. As is the case with stops 158 and 160, stops 216 and 218 are laterally disposed about the shaft assembly 170 having their inner surfaces in confronting relationship. An index plate 220 is secured to the inner shaft 176 for rotation and axial movement therewith.

Index plate 220 includes a projection, similar to projection 162, for contacting the stop plates of the stops 216 and 218 when the shaft assembly 170 is in its outer position. Hence, the index plate 220, in conjunction with the stops 216 and 218, assures accurate indexing of the transfer arm 70 in its outer position.

Returning to FIG. 4, a tool carrier 46, shown partly in section, is illustrated at the transfer station prior to being pivoted 90° to the horizontal tool transfer position adumbrated by the phantom lines. Tool carrier 46 possesses a cavity 46a, as defined by a key 46b and a bushing 46c disposed in an intermediate portion of the tool carrier 46. The tool is maintained in the tool carrier 46 by means of a spring loaded, ball detent 46d inserted in the base of the cavity 46a. The base 46f of the tool carrier 46 embodies a cavity 46g in which two aligned rollers 46h are mounted for rolling contact on the upper surface of the track 44 adjacent the groove 140. Extending downwardly from the base 46f of the tool carrier is an arcuate arm 46i which is provided with a forward facing groove 46j for snugly receiving the cylindrical structure 48a at its lower most portion. At the end of the arm is another roller 46e which rides on the lower surface of track 44. The groove 46j is tapered so that it widens in an upward direction, as viewed in FIG. 4, to allow lateral displacements of the tool carrier 46 when the centering structures, i.e., lugs 120 and 122, are touched by the pivoting tool carrier. Thus, if the tool carrier 46 is not exactly centered on track segment 50 when it is lowered to the tool transfer position, the groove 46j will accommodate small displacements of the tool carrier 46 as the lugs 120 and 122 are contacted. The arm 46i and the base 46f of the tool carrier 46 are provided with two pairs of axially aligned cam followers, one pair being denoted 46k and 46L. Each pair of cam followers have their rollers received in the grooves 140 and 142 of the track 44. Therefore, it is the cam followers, together with the rollers 46e and 46h, which guide the movement of the tool carrier about the track 44.

With continued reference to FIG. 4, it will be noted that the tool carrier 46 is furnished with a plurality of vertically spaced and aligned cam structures, 46m. The upper most cam structure is adapted to engage limit switches 64 and 66, whereas the other cam structures engage the limit switches of the encoder 62. Each tool carrier will have an upper most cam structure and one or more cam structures therebelow arranged to assign a particular code to the carrier. Referring to FIGS. 1–4, in order to insure proper positioning of the tool carriers 46 before and during cam structure engagement with the limit switches of encoder 62 and limit switches 64 and 66, two spring urged stabilizer bar assemblies 222 and 224 are adjustably carried by the horizontal plate 105.

The indexing device, which rotates the transfer arm 70 to the four index positions, is shown in FIGS. 5 and 7. With reference to FIG. 5, which is a top plan view of the transfer mechanism, a first index slide 230, a second index slide 232, and a third index slide 234 control the movement of the rack 182 which rotatably positions the transfer arm 70. The slide 234 is fixedly connected to the rack 182 so that the rack will exactly follow the movements thereof, the other slides 230 and 232 not being connected to the rack 182. The slides 230, 232 and 234 are mounted for axial sliding movement over a pair of spaced rods 236 and 238 which are secured to the vertical plate 152a and the web 152e and additionally supported by brackets 236a and 236b mounted to the plates 152i and 152j, respectively. Movement is imparted to the slides by a first piston assembly 240, a second piston assembly 242, and a third piston assembly 244, all of which have equal strokes. The piston assemblies 240, 242 and 244 each have their respective shafts connected to the slides 230, 232 and 234. It will be noted that the piston assemblies are arranged in the transfer mechanism in series relationship. The piston assembly 240 is fixedly secured to the rear side of the vertical slide 246, with an extension shaft slideably contained in a passage 30a in the slide 30. A bar 246 and a bar 248 are arranged intermediate the rods 236 and 238 in parallel relationship thereto and laterally spaced from the piston assemblies 240, 242 and 244. The bars 246 and 248 also extend through coaxial passages in the vertical slide 30 such that they may slide therein. The bars 246 and 248 pass through the slides 230, 232 and 234, as illustrated in FIG. 4 for the slide 232. The bar 246 has a plurality of stops 246a, 246b, 246c, 246d, 246e and 246f thereupon, which are each formed by a plurality of nuts. The bar 248 has corresponding stops positioned thereupon, designated 248a through 248f. It is important to note that the index slide 230 is fixedly secured to the bars 246 and 248, so as to be bidirectionally movable therewith, by a nut 246g and a corresponding nut on bar 248.

Neglecting the inward and outward movements of the transfer arm 70, rotational indexing of the transfer arm 70 is accomplished as follows: initially, the transfer arm 70 is in its first index position, wherein the shafts of the respective piston assemblies 240, 242 and 244 are retracted. Extension of the shaft of piston assembly 240 produces a downwardly sliding of index slide 230 over the rods 236 and 238. This movement of slide 230 produces a corresponding movement of bars 246 and 248 since they are fixedly connected thereto. The downward movement of slide 230, as viewed in FIG. 5, also produces a corresponding downward movement of slides 232 and 234 since the movement of slide 230 is transmitted to slide 232 by stops 246c and 248c and the shaft of piston assembly 242, and since this movement is also transmitted to slide 234 by stops 246e and 248e and the shaft of piston assembly 244. The transfer arm 70 now occupies its second index position, with the stops 246a and 248a in abutment with the back surface of the vertical slide 30. To rotate the transfer arm to the third index position, the shaft of piston assembly 242 is extended until slide 232 contacts the stops 246d and 248d on the respective bars 246 and 248, the bars remaining in fixed position with their stops 246a and 248a in abutment with the back surface of the vertical slide 30. Movement of the slide 232 down to the stops 246d and 248d produces a corresponding movement of slide 234 by virtue of the interconnecting piston assembly 244. Also during this movement, the stops 246f and 248f enter the passages in the lower portion of the slide 234, these passages permitting untrammeled movement of the stops therethrough. Next, extension of the shaft of piston assembly 244 results in a further downward sliding of the slide 234 until the stops 246f and 248f contact the slide 234 on the wall 234a. The transfer arm now occupies its fourth index position which is the initial position for rotation in the opposite direction.

After a new tool is clamped in the transfer arm 70, the old tool having been returned to the magazine in the fourth index position, retraction of the shaft of piston assembly 240 moves slide 230 upwardly, thereby carrying slides 232 and 234 a corresponding distance upwardly, this action being attributed to the fact that stops 246f and 248f continue to abut wall 234a and that slides 234 and 232 are interconnected by piston assembly 244. The upward movement of slide 230 is terminated when stops 246b and 248b abut the vertical plate 152a of the second main supporting structure. The transfer arm has now assumed the third index position with the slide 232 in abutment with the stops 246d and 248d. Next, retraction of the shaft of piston assembly 242 produces an upward movement of the slide 232 and a corresponding upward movement of slide 234 by virtue of the interconnecting piston assembly 244. The transfer arm is now in the second index position with the stops 246c and 248c in abutment with the slide 232. Finally, movement of the transfer arm to the first index position is occasioned by a retraction of the shaft of piston assembly 244 until the slide 234 abuts the stops 246e and 248e. The transfer arm 70 is now ready to again replace an old tool in the tool storage magazine and receive a new tool therefrom. The enumerated index positions of the rack 182, and hence the transfer arm 70, are sensed by a first limit switch 250, a second limit switch 252, a third limit switch 254, and a fourth limit switch 256. A cam member 258, affixed to the rack 182, is adapted to contact each of these switches in the respective index positions of the transfer arm 70.

Turning now to FIGS. 4, 5 and 8, limit switches 260 and 262 are contacted by a cam member 264 when the transfer arm occupies its respective inner and outer positions. Inward and outward movement of the shaft assembly 170 is transmitted to the cam member 264 by a rod 266 fastened to the collar 214. Again, it will be noted that the collar 214 does not rotate, but only moves axially with the shaft assembly 170.

Figure 9:
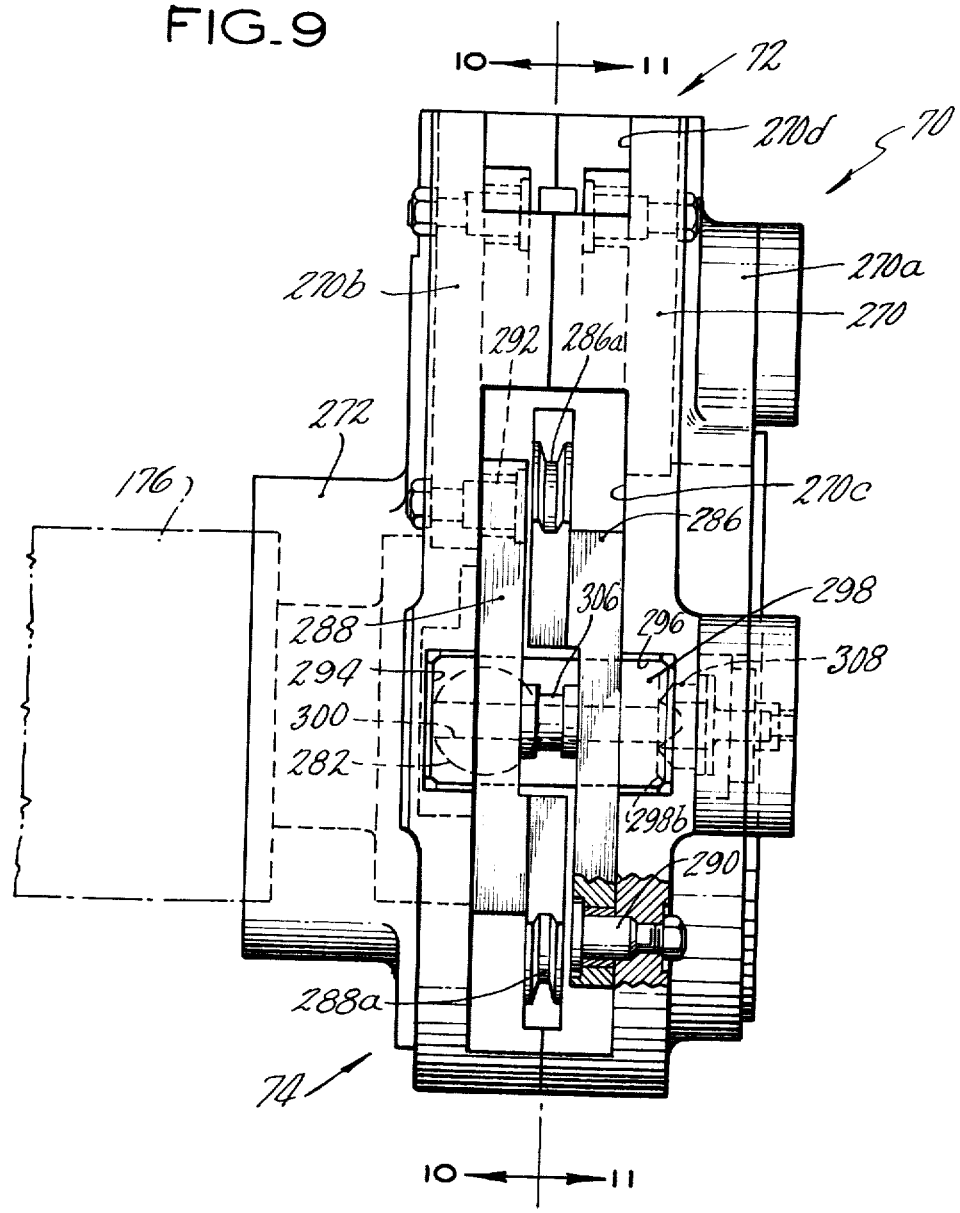
FIG. 9 is a side view of the transfer arm, per se, taken along the line 9—9 of FIG. 3.
Figure 10:
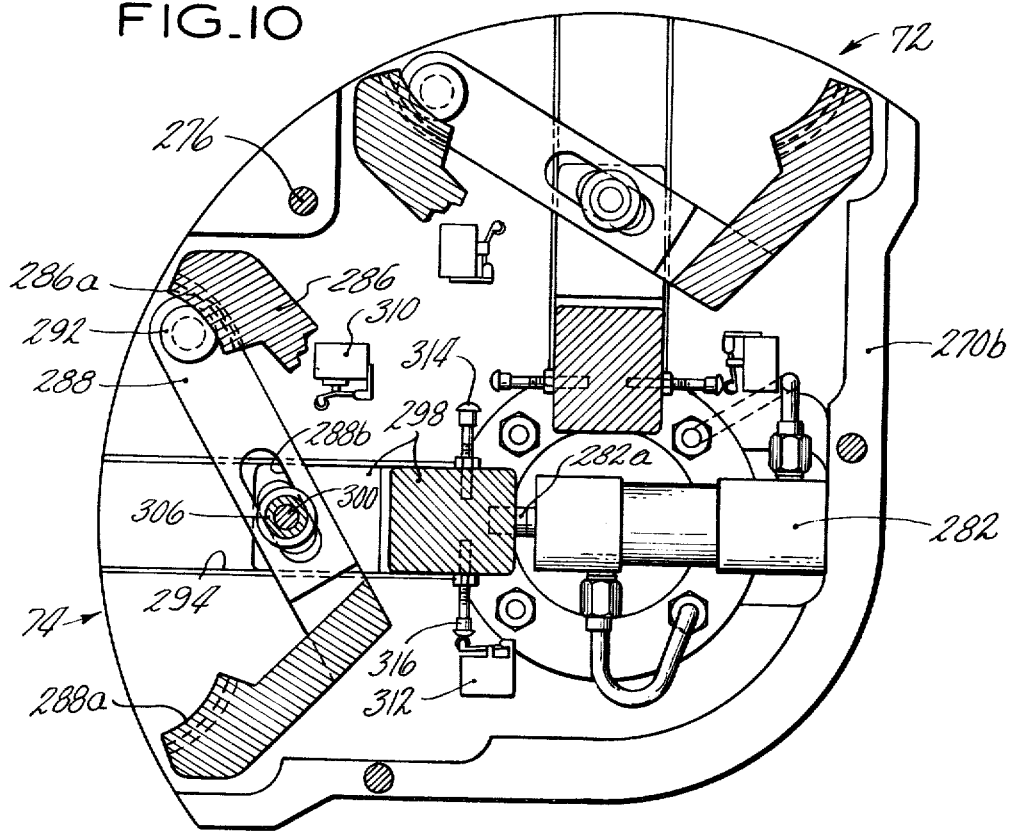
FIGS. 10 and 11 are sectional views of the transfer arm taken along the lines 10—10 and 11—11, respectively, of FIG. 9.
Figure 11:
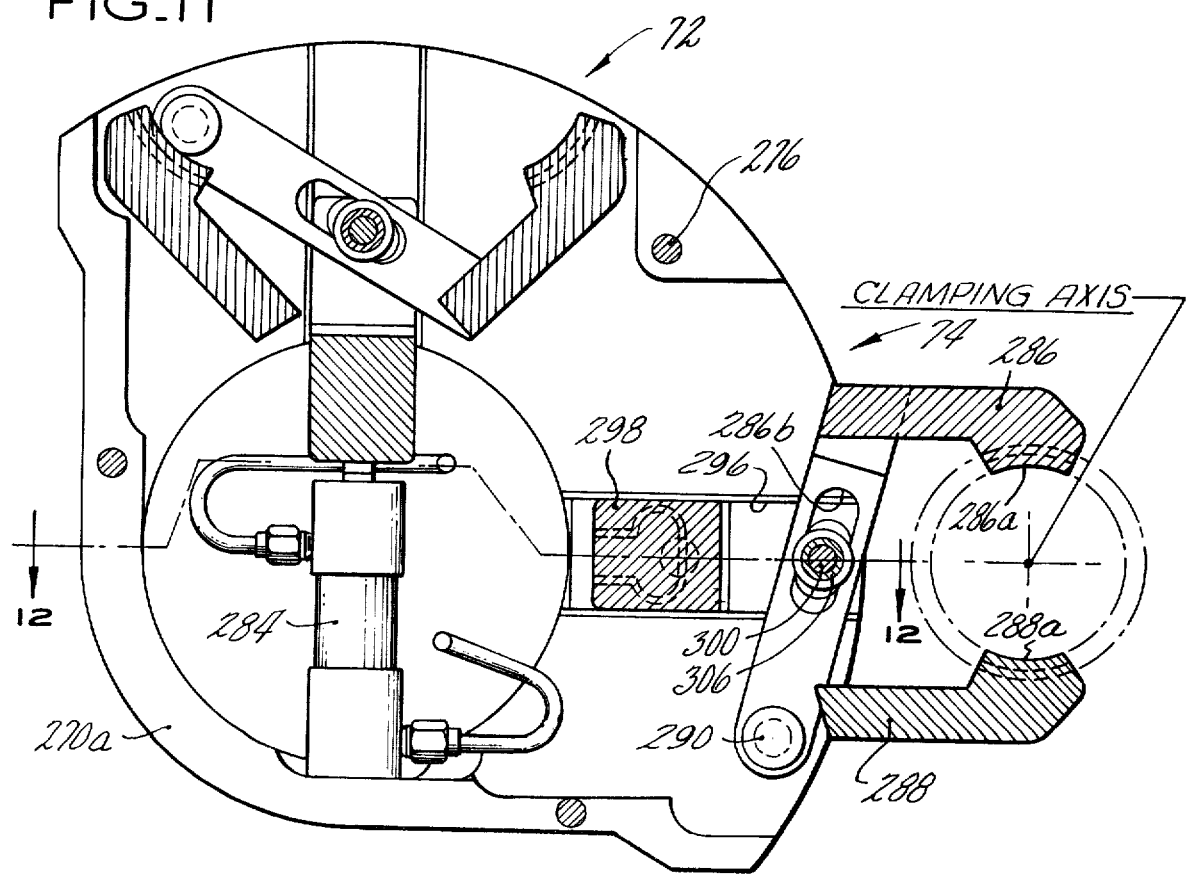

The detailed structure of the transfer arm 70 is illustrated in FIGS. 9 through 12. The transfer arm, per se, is shown in FIG. 9 as it would appear looking along the line 9—9 of FIG. 3. In the transfer arm 70 of FIG. 9, the clamping devices are retracted. The transfer arm 70 comprises a housing 270 having a hub 272 in which is fashioned a recess 274 for receiving the inner shaft 176, the inner shaft and the hub 272 being secured together by suitable means not shown. The housing 270 of the transfer arm 70 is constituted by a front portion 270a and a rear portion 270b held in abuting relationship by a plurality of fasteners 276 (FIGS. 10 and 11). When the housing portions 270a and 270b interface in abutting relationship to define the housing 270, a shell-like structure is formed with a generally hollow interior and angularly spaced periphereal openings 270c and 270d. In the housing 270 are positioned the two clamping devices, generally designated 72 and 74, which are extensible to grasp a tool and retractable to release a tool, in mutually transverse directions which are preferably perpendicular.

Figure 12:
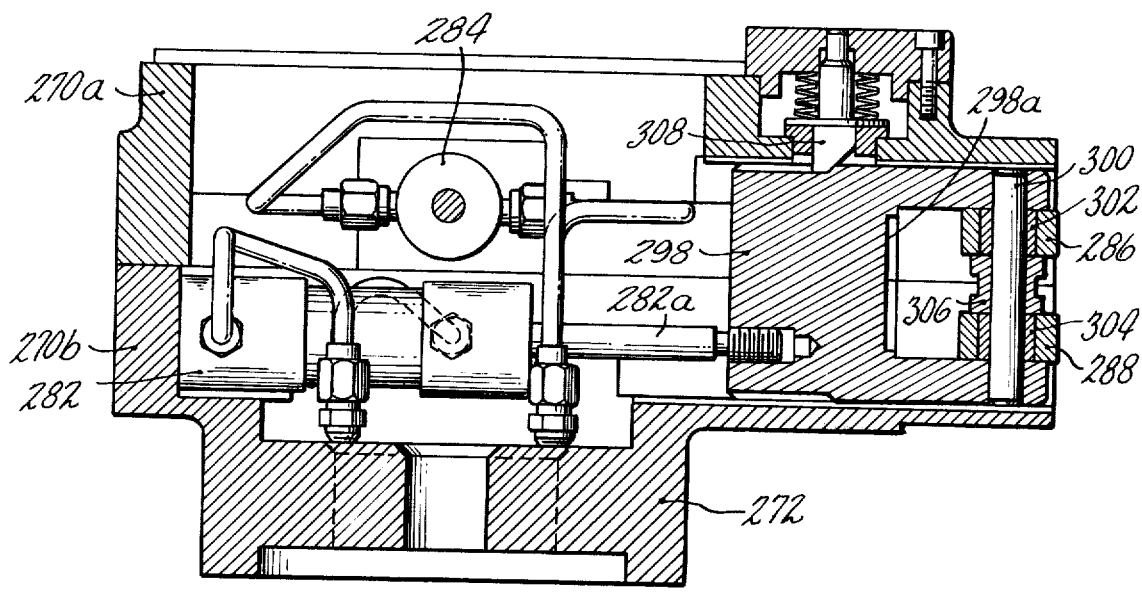
FIG. 12 is a sectional view of the transfer arm taken along the line 12—12 of FIG. 11.

As best shown in FIGS. 10, 11 and 12, the clamping devices 72 and 74 are substantially identical, the devices differing in the manner of attachment to and the arrangement of two actuators, shown as piston assemblies 282 and 284 which respectively extend and retract the clamping devices. The clamping device 74 is defined by a pair of L-shaped fingers 286 and 288. The fingers 286 and 288 are mounted for pivoting movement about the respective pins 290 and 292 which interconnect the fingers to the housing 270. As revealed in FIGS. 10 and 11, the fingers 286 and 288 each comprise contoured faces 286a and 288a for grasping a curvilinear portion of a tool adapter. Extension of the fingers 286 and 288 is simultaneously produced by an extension of the shaft 282a of piston assembly 282. A channel 294 and a confronting channel 296 formed in the respective portions of the housing 270 define a guide recess for a slider 298, to which is attached the shaft 282a of piston assembly 282. The slider 298, which is generally rectangular in configuration, may be axially displaced from a retracted position, illustrated in FIG. 10, to an extended position illustrated in FIG. 11. Slider 298 is formed with a cavity 298a which has a pin 300 mounted in the slider so as to extend between the walls thereof. Surrounding the pin 300 and disposed in a vertically spaced relationship, when viewed in FIG. 12, are shoes 302 and 304 which are received within elongated slots 286b and 288b. A spacer 306 is interposed between the shoes 302 and 304 to maintain the spaced relationship between the shoes 302 and 304. During extension and retraction of the slider 298, relative movement is occasioned between the slots 286b and 288b and the pin 300 to accommodate the pivoting of the fingers 286 and 288. A spring loaded lock 308 is mounted in the housing so as to continuously engage a peripheral surface of the slider 298 which is recessed at 298b so that the lock 308 may contact the slanting wall 298c to retain the slider in the extended position should fluid pressure be lost. The lock 308 insures that the fingers will not release a tool adapter held therebetween if for some reason (such as a power failure) fluid pressure in the piston assembly 282 is lost. The extended and retracted positions of the clamping device 278 are sensed by limit switches 310 and 312, respectively, as they are engaged by projecting cam members 314 and 316 which are secured to and extend laterally from the slider 298.

With respect to the clamping device 280, it may be observed in FIG. 12 that the piston assembly 284 therefor is disposed above and transverse to the piston assembly 282. This arrangement allows for a compact construction of the transfer arm 70. Although the axes of the sliders of the respective clamping devices 278 and 280 lie generally in the same plane, it will be noted that the shafts of the respective piston assemblies engage the sliders at different locations. Referring to FIG. 4 in conjunction with FIG. 12, fluid is supplied to and exhausted from the piston assemblies 282 and 284 by a plurality of tubes which are either supplied or exhausted by passages, such as those shown at 318 in FIG. 4.

Figure 13:
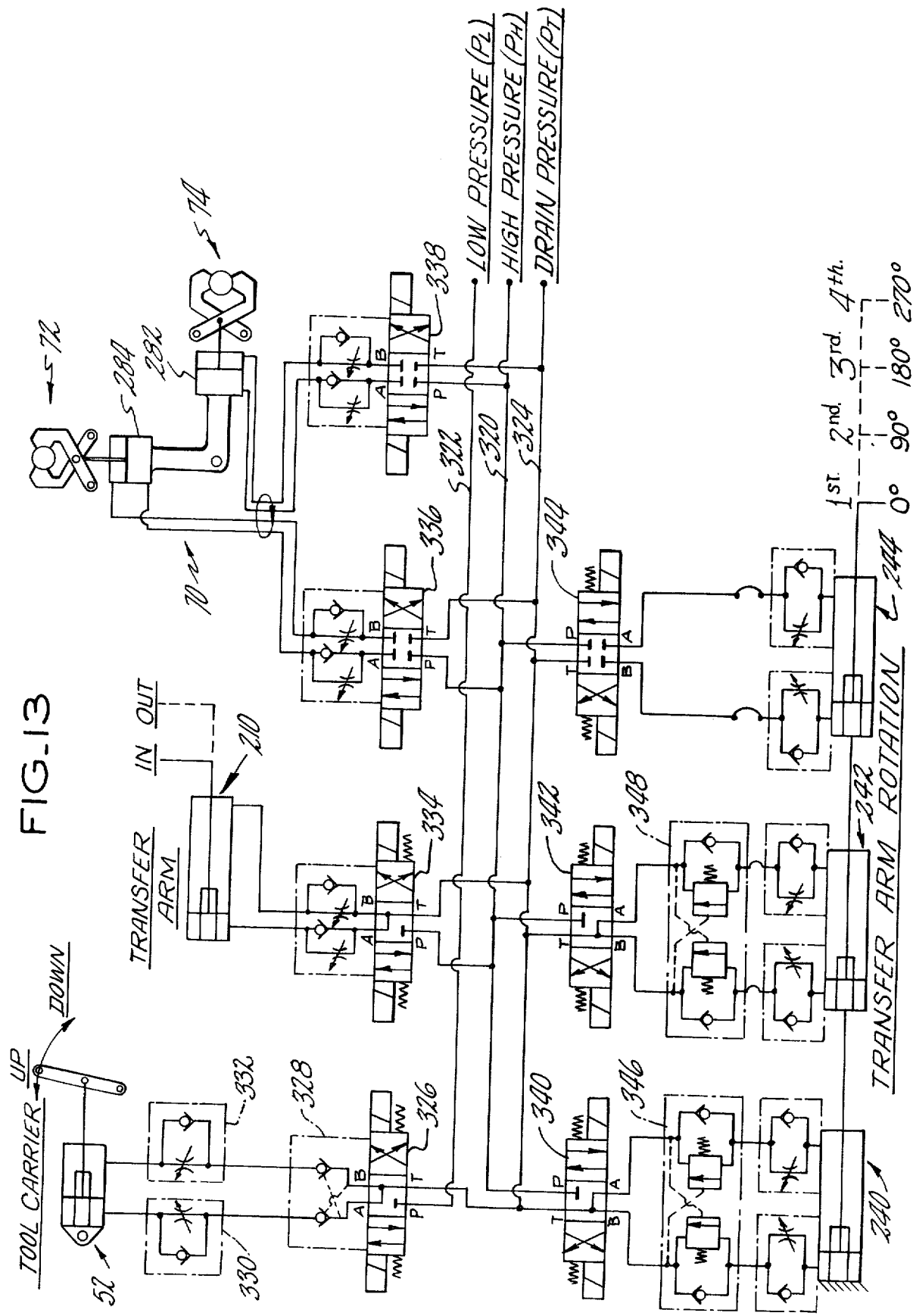
FIG. 13 is a diagramatic view of the hydraulic circuit which controls the rotation and translation of the transfer arm and the positioning of a tool carrier in the transfer position.

A schematic view of a preferred hydraulic control circuit for the illustrated tool changer assembly 38 is depicted in FIG. 13. Conduits 320 and 322 are connected to respective sources of high (Ph) and low (Pl) hydraulic pressure which supply fluid to the various piston assemblies in the tool changer assembly 38. A conduit 324 is included to reference the piston assemblies to a source of drain or tank pressure (Pt).

The piston assembly 52 is connected to the conduits 322 and 324 through a four-way, solenoid operated, spring centered, open center valve 326 having ports P and T for respective communication with conduits 322 and 324. The ports, designated A and B, of the valve 326, which communicate the pressures Pl and Pt to the opposite sides of the piston of piston assembly 52, communicate with the piston assembly via a double cylinder locking manifold 328 and a pair of flow control valves 330 and 332. The manifold 328 insures that fluid will remain trapped on either side of the piston of piston assembly 52 when the valve 326 is centered, thereby preventing pivoting movement of a tool carrier until valve 326 is repositioned. The flow control valves 330 and 332 are furnished to prevent excessive angular velocities in a tool carrier which is either being lowered to the transfer position or raised therefrom. It will be noted from FIG. 13 that each of the piston assemblies in the transfer mechanism is similarly provided with a pair of flow control valves.

The transfer arm piston assembly 210 which moves the transfer arm 70 between its inward and outward positions communicates with the pressure Ph and the pressure Pt through a four-way, solenoid controlled, spring centered, open center valve 334 which is similar to valve 326. With respect to the piston assemblies 282 and 284 of transfer arm 70 which extend and retract the clamping devices 72 and 74, respectively, the pressures Ph and Pt are communicated thereto via four-way, solenoid controlled, spring centered, close center valves 336 and 338. It is not necessary to provide a valve, such as a double cylinder locking manifold 328, to maintain the clamping devices 72 and 74 in the extended positions since the clamping devices are mechanically locked in their extended positions by a mechanical device as described heretofore with reference to FIG. 12.

The indexing piston assemblies 240, 242 and 244 communicate with the pressures Ph and Pt via an open center valve 340, an open center valve 342 and a closed center valve 344. Regarding the piston assemblies 240 and 242, a holding valve 346 and a holding valve 348 are respectively interposed between the associated flow control valves and the four-way valves 340 and 342 to further limit the angular acceleration of the transfer arm 70 which would be engendered by a center of gravity offset from the axis of rotation; this acceleration would otherwise be pronounced when heavy tools are retained. A holding valve is not deemed necessary for piston assembly 244 since the center of gravity of the transfer arm 70 in the third index position is positioned so as to oppose rotational movement by piston assembly 244. Thus, the holding valves prevent undesirable angular acceleration of the transfer arm 70 which would otherwise militate against accurate indexing.

Before describing the operation of the tool changer of the invention, it must be stressed that the invention is not limited to the details of construction shown and described herein, except as set forth in the appended claims, these details being illustrated only to describe the best mode presently known of carrying out the invention. For example, a tool changer of the invention will find utility in other than three-axis machine tools incorporating vertical slides and having heads horizontally movable thereupon. Furthermore, the illustrated magazine could be readily replaced by a circular type magazine in which the tool carriers need not necessarily undergo a rotational displacement at the transfer station. Also, the shaft assembly 170 which displaces the transfer arm inwardly and outwardly may be obviated if the tools are displaced from the magazine by a structure associated therewith and a positionable spindle is included in the head. While the tool changer of the invention is particularly well-suited to hydraulic controls, it will be appreciated by those skilled in the art that alternate systems of controls such as electrical controls which directly move the components of the tool changer would also be well-suited for use in a tool changer of the invention. Moreover, a transfer mechanism of the invention need not employ index positions which are spaced 90°. To briefly explain, assume that a transfer arm is utilized, wherein the axes of the clamping devices are spaced an arbitrary angle, for example, 50°, and that a single tool transfer position is utilized. In this situation, the first and second index positions define a 130° arc; the second and third index positions define a 50° arc; and the third and fourth index positions define a 130° arc, there being an overall arc of 310° between the first and the fourth index positions. Thus, it will be understood that it is the spacing of the clamping devices and the arrangement of the tool transfer positions (should there be two) which dictate the angles between index positions. Also, it will be understood that although a single tool transfer position is advantageous, a tool changer of the invention may employ two tool transfer positions. In addition, the transfer arm 70 need not be shaped as a sector of circle, although such a configuration contributes to a larger clearance between the transfer arm and the spindle housing.

OPERATION

After a tool change has been commanded by a data reading device, such as a tape reader, a controller initiates clockwise movement of the tool carriers about the track 44 and initially selects a particular tool carrier, designated B, for the subsequent tool changing operation. As the selected tool carrier with the new tool B engages the bank of limited switches 62, a signal is conveyed to the controller indicating the proximity of the selected tool carrier to the transfer station at the track segment 50. Further clockwise movement of the selected tool carrier about the track 44 induces a contact between the tool carrier B and the limit switch 64 which produces a reduction in the speed of DC motor 58 so that subsequent contact between the selected tool carrier and the transfer station limit switch 66 may accurately stop the selected tool carrier at the transfer station. The controller then actuates the piston 52, thereby pivoting the track segment 50 through a 90° arc. Since the selected tool carrier is presently on this pivotable section of track, it also pivots 90° from a vertical position to a horizontal position which is the tool transfer position, as shown in FIG. 1. Clamping device 72 now grasps the tool, also designated B in FIG. 14a, in the selected tool carrier. The transfer arm 70 subsequently moves outwardly to its outer position, thereby withdrawing the tool B from the selected tool carrier. Next, the transfer arm 70 moves inwardly after the selected tool carrier has been returned to a vertical position, the selected tool carrier being empty at the time as shown in FIG. 14a. The transfer arm is now in its first index position and in its inner position. This is the condition depicted in FIG. 14a. Immediately after the selected tool carrier has been returned to its vertical position at the tool transfer station, the tool carriers are driven around the track in a search for the empty tool carrier A of the tool designated A, which is presently inserted in the spindle 34. During this search for the empty tool carrier of tool A, tool A, itself, is at work machining a workpiece. Thus, it will be appreciated that the transfer of a new tool to transfer arm 70 in no way interferes with machining operations presently underway. The transfer arm 70, in the position of FIG. 14b, is now ready to undertake a tool changing operation upon a command signal which will be generated when the current machining operation is completed.

When the controller commands a tool change, transfer arm 70 moves from the position of FIG. 14b in a counterclockwise manner to the position of FIG. 14c, the position of FIG. 14c being the second index position of transfer arm 70 which is spaced 90° from the first index position of transfer arm 70. It will be understood that prior to movement from the position of FIG. 14b to the position of FIG. 14c, the spindle 34 has been stopped and the spindle housing 32 has been moved, relative to the vertical slide 30, to a position where the transfer arm 70 is aligned with the spindle 34 such that clamping device 74 may grasp the used tool A upon a subsequent rotation of the transfer arm 70. As shown in FIG. 14d, clamping device 74 now grasps used tool A. The transfer arm now moves outwardly to its outer position, illustrated in FIG. 14e, whereby the used tool A is withdrawn from the spindle. The transfer arm 70, while still in its outer position, is rotated in a counterclockwise fashion from the second index position to the third index position of FIG. 14f, thereby aligning the new tool B with the spindle. Again, it will be noted that the third index position of FIG. 14f is offset 90° from the second index position of FIG. 14e. An inward movement of the transfer arm 70 to the position of FIG. 14g begets an insertion of the new tool B in the spindle 34. After the spindle 34 secures the tool B therein, the clamping device 72 is retracted (FIG. 14h) and the transfer arm is then rotated in a counterclockwise direction through an arc of 90° to the fourth index position thereof, depicted in FIG. 14i. After the transfer arm achieves the position of FIG. 14i, the spindle begins another machining operation. The lost machining time for tool changing, that is, the time it takes to move the transfer arm 70 from the position of FIG. 14b to the position of FIG. 14i, will typically be about 5 seconds.

Next, the transfer arm 70 moves to its outer position which is followed by a lowering of the empty tool carrier of tool A, thereby to align the tool carrier of tool A with tool A, as illustrated in FIG. 14j. The transfer arm now moves inwardly to the position of FIG. 14k to effect a replacement of the tool A in its tool carrier. Clamping device 74 is then retracted (FIG. 14L). Upon the retraction of clamping device 74, the tool carrier with the used tool A therein is pivoted to the vertical position at the transfer station (FIG. 14m). With the transfer arm in the fourth index position and with both of the clamping devices 72 and 74 in the retracted state, a search (FIG. 14n) is conducted for the tool to be utilized in the next machining operation, this tool being designated C. FIG. 14o depicts the arrival of the tool carrier C with the new tool C therein at the transfer station whereupon the tool carrier with the tool C therein is lowered to the transfer position of FIG. 14p. Clamping device 74 is extended, as shown in FIG. 14q to grasp the tool C. Now, the transfer arm moves to the position of FIG. 14r to thereby withdraw the tool C from its tool carrier. Piston 52 now retracts to raise the tool carrier of tool C to the vertical orientation of FIG. 14s while the clamping device 72 continues to secure tool C with the transfer arm 70 in its outer position. Again, a search is begun for the empty tool carrier of tool B (FIG. 15b), which is now at work in the spindle 34, after the transfer arm 70 has moved inwardly to its inner position of FIG. 15a. It should be noted at this point that FIG. 15a, which depicts the transfer arm 70 in the fourth index position, corresponds to FIG. 14a wherein the transfer arm 70 is in the first index position. For convenience, the positions depicted in FIGS. 14b and 15b may be regarded as initial positions of the transfer arm 70, wherein a commanded tool change is awaited. With the transfer arm in its fourth index position and new tool C secured in clamping device 74, the tool changer is awaiting a tool change command from the controller.

Figure 15F:
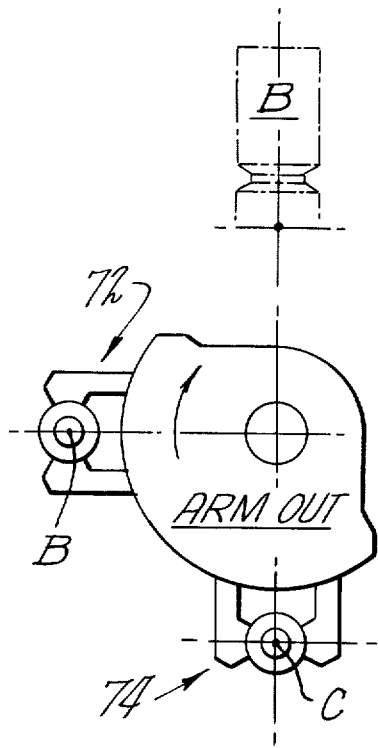
Figure 15G:
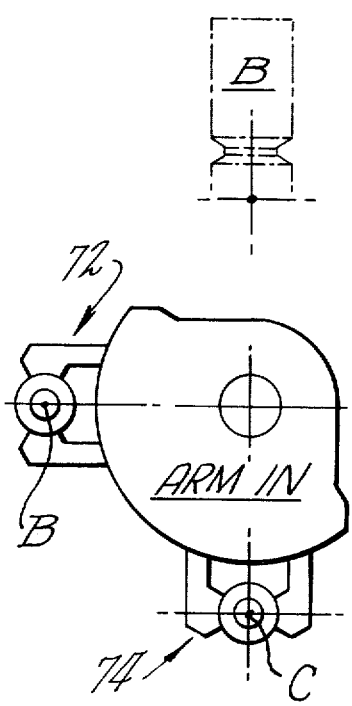
Figure 15H:
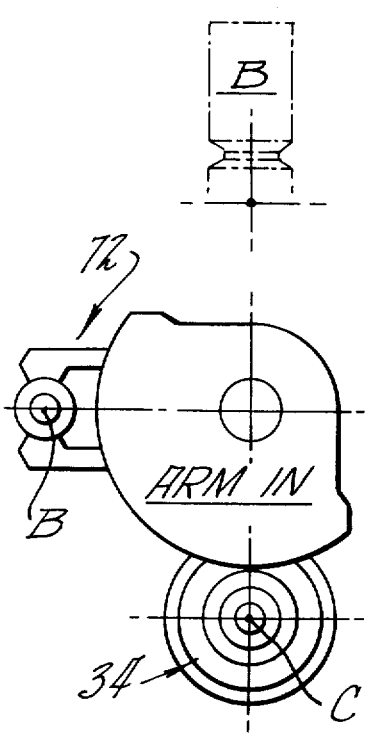
Figure 15I:
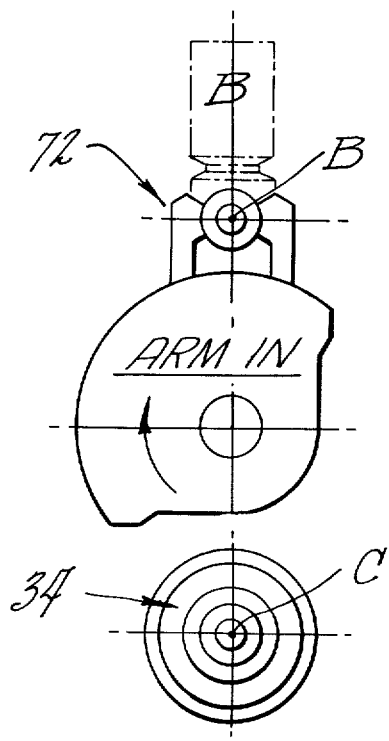

Upon appropriate commands from the controller, the transfer arm rotates in a clockwise manner to the position of FIG. 15c, the third index position of the transfer arm 70. Prior to rotating to this position, the spindle has been stopped and the spindle housing 32 positioned. Next, clamping device 72 extends to grasp the tool B in the spindle and the transfer arm 70 is moved outwardly to its outer position of FIG. 15e to withdraw the tool B therefrom. The transfer arm 70 subsequently rotates 90° to its second index position of FIG. 15f while remaining in its outer position. Inward movement of the transfer arm 70 to the position of FIG. 15g causes insertion of the tool C in the spindle 34, whereupon the tool is secured therein. Upon the securing of the tool C in the spindle 34, clamping device 74 is retracted, as reflected in FIG. 15h. The transfer arm then rotates in a counterclockwise direction from the second index position of FIG. 15h to the fourth index position of FIG. 15i.

In order to reinsert the tool B in its empty tool carrier which is waiting at the transfer station, the transfer arm 70 moves out, the carrier is lowered, the transfer arm 70 moves in, thereby inserting the tool B in its carrier, the clamping device 72 is retracted and the carrier pivoted to its vertical position, these operations not being shown in the drawings.

We claim:

1. In a machine tool, the combination comprising:
  a frame;
  a vertical slide secured to the frame for vertical movement thereupon;
  a spindle housing, having a spindle, mounted upon the vertical slide for horizontal movement, the spindle being adapted to receive and lock a tool therein;
  a tool changer supporting structure vertically spaced above the spindle housing and directly connected to and supported by the vertical slide so as to extend laterally from the face thereof in cantilever fashion such that the load carried thereby is not transmitted to the spindle housing;
  a tool storage magazine secured to the supporting structure for carrying a plurality of tools and presenting a selected tool to a tool transfer position;
  a tool transfer arm mounted upon the supporting structure intermediate the magazine and the spindle for rotation about an axis;
  first and second angularly spaced clamping devices operatively connected to the transfer arm for selective extension and retraction relative to the axis of rotation in mutually transverse directions to respectively grasp and release a tool;

first and second actuators respectively operatively connected to the first and second clamping devices for the extension and retraction thereof; and an indexing device operatively connected to the transfer arm for rotating the transfer arm between first, second, third and fourth index positions such that the first clamping device may extend and grasp the selected tool in the transfer position in the first index position, the second clamping device may extend and grasp a used tool in the spindle in the second index position, the selected tool held by the first clamping device is aligned with the spindle in the third index position so as to be insertable therein, and the used tool held by the second clamping device is aligned with the magazine in the fourth index position so as to be insertable therein.

2. The combination of claim 1, wherein the respective clamping axes of the clamping devices are generally parallel to the axis of rotation and define an approximate 90° angle with respect thereto and wherein adjacent index positions define approximate 90° angles.

3. The combination of claim 1, wherein the transfer arm comprises:

a housing; and wherein each of the clamping devices comprise:

two fingers pivotally connected to the transfer arm housing for respective movement between extended and retracted positions; and a slider mounted within the transfer arm housing for axial sliding movement between extended and retracted positions, the slider being connected to the fingers and the actuator therefor such that operation of the actuator produces a pivoting of the fingers to their extended positions whereby the fingers may grasp a tool.

4. The combination of claim 3, wherein each actuator comprises:

a piston assembly having its shaft connected to the associated slider; and wherein there is further provided:

means to lock each slider in the extended position thereof.

5. The combination of claim 1, wherein the indexing device comprises:

a shaft connected to the transfer arm and mounted upon the supporting structure for rotation about an axis coincident with the axis of rotation of the transfer arm;

a pinion coaxially mounted upon the shaft to impart rotation thereto;

a rack mounted upon the supporting structure for axial movement, the rack being in meshing engagement with the pinion; and means to displace the rack between four discrete positions respectively corresponding to the index positions of the transfer arm.

6. The combination of claim 5 wherein the shaft is mounted upon the supporting structure for axial movement such that axial displacements of the shaft produce corresponding inward and outward movements of the transfer arm between an inner position and an outer position whereby: the selected tool may be withdrawn from the magazine by the first clamping device in the first index position by an outward movement of the transfer arm, a used tool in the spindle may be withdrawn therefrom by the second clamping device in the second index position by an outward movement of the transfer arm, the selected tool may be inserted in the spindle in the third index position by an inward movement of the transfer arm, and the used tool may be inserted in the magazine in the fourth index position by an inward movement of the transfer arm; and wherein there is further provided:

a third actuator connected to the supporting structure for axially displacing the shaft.

7. The combination of claim 1, wherein the indexing device comprises:

means to bidirectionally rotate the transfer arm such that the second, third and fourth index positions are successively occupied by the transfer arm during rotation in a predetermined direction from the first index position, and the third, second and first index positions are successively occupied by the transfer arm during rotation in the direction opposite to the predetermined direction.

8. The combination of claim 7, wherein the transfer arm rotates through an approximate 270° angle in rotating between the first and the fourth index positions, whereby the second clamping device may place the used tool in the tool transfer position when the transfer arm occupies the fourth index position.

9. In a machine tool comprising a frame, a vertical slide mounted upon the frame for vertical movement, and a spindle housing, including a spindle, mounted upon the vertical slide for horizontal movement;

a tool storage magazine comprising a horizontal track extending laterally of the vertical slide;

a plurality of coded tool carriers for carrying a plurality of tools mounted in vertical orientation upon the track for movement therearound;

means to lower a selected tool carrier at a transfer station on the track to a horizontal tool transfer position where a new tool therein may be withdrawn therefrom or a used tool inserted therein;

a tool changer supporting structure vertically spaced above the spindle housing and directly connected to and supported by the vertical slide so as to extend laterally from the face thereof in cantilever fashion, the track being carried upon the supporting structure;

a tool transfer arm mounted upon the supporting structure intermediate the transfer position and the spindle for rotation about an axis equidistant from and parallel to the axis of a tool in the transfer position and the axis of the spindle and for outward and inward axial movement along the axis of rotation respectively away from and toward the tool transfer position and the spindle between inner and outer positions;

first and second angularly spaced clamping devices operatively connected to the transfer arm for selective extension and retraction relative to the axis of rotation in mutually transverse directions to respectively grasp and release a tool such that outward movements of the transfer arm may withdraw a tool held by a clamping device from the selected tool carrier at the tool transfer position or the spindle and inward movements of the transfer arm may insert a tool held by a clamping device in a tool carrier at the transfer position or the spindle;

first and second actuators respectively operatively connected to the first and second clamping devices for the extension and retraction thereof; and an indexing device operatively connected to the supporting structure and the transfer arm for rotating the transfer arm between first, second, third and fourth index positions such that the first clamping device may extend and grasp the new tool in the selected tool carrier in the transfer position and withdraw the new tool from the selected tool carrier by an outward movement of the transfer arm in the first index position, the second clamping device may extend and grasp the used tool in the spindle and withdraw the used tool therefrom by an outward movement of the transfer arm in the second index position, the new tool held by the first clamping device is aligned with the spindle in the third index position so as to be insertable therein by an inward movement of the transfer arm, and the second clamping device is aligned with an empty tool carrier in the tool transfer position in the fourth index position so that the used tool is insertable therein by an inward movement of the transfer arm.

10. The combination of claim 9, wherein the indexing device comprises:

means to bidirectionally rotate the transfer arm such that the second, third and fourth index positions are successively occupied by the transfer arm during rotation in a predetermined direction from the first index position and the third, second and first index positions are successively occupied by the transfer arm during rotation in the direction opposite to the predetermined direction.

11. The combination of claim 10, wherein the bidirectional rotating means comprises:

a shaft connected to the transfer arm and mounted upon the supporting structure for rotation about and axial movement along an axis coincident with the axis of rotation of the transfer arm;

a pinion coaxially mounted upon the shaft to impart rotation thereto;

a rack mounted upon the supporting structure for axial movement, the rack being in meshing engagement with the pinion; and means to displace the rack between four discrete positions respectively corresponding to the index positions of the transfer arm.

12. The combination of claim 11, wherein the rack displacing means comprises:

first, second and third indexing piston assemblies operatively connected in series relationship to the rack such that successive extension of the respective shafts thereof causes the transfer arm to successively assume the second, third and fourth index positions, and such that successive retraction of the respective shafts thereof causes the transfer arm to successively assume the third, second and first index positions.

13. The combination of claim 9, wherein the transfer arm comprises:

a housing; and wherein each of the clamping devices comprises:

two fingers pivotally connected to the housing for respective movement between extended and retracted positions; and a slider mounted within the transfer arm housing for axial sliding movement between extended and retracted positions, the slider being connected to the fingers and the actuator therefor such that operation of the actuator produces a pivoting of the fingers to their extended positions, whereby the fingers may grasp and hold a tool.

14. The combination of claim 13, wherein each actuator comprises:

a fluid operated piston assembly having its shaft connected to the associated slider; and wherein each of the clamping devices further comprises:

means to lock each slider in the extended position thereof.

15. The combination of claim 9, wherein the indexing device comprises:

stop means secured to the supporting structure to mechanically stop the rotation of the transfer arm at the respective index positions.

16. In a machine tool, the combination comprising:

a frame;

a vertical slide secured to the frame for vertical movement thereupon;

a spindle housing, having a spindle, mounted upon the vertical slide for horizontal movement;

means to support a workpiece;

means to produce relative horizontal movement between the support means and the spindle housing transverse to the horizontal movement of the spindle housing;

a tool storage magazine extending laterally of the face of the vertical slide in vertical spaced relationship to the spindle housing for storing a plurality of tools;

a tool transfer mechanism extending laterally of the face of the vertical slide in vertical spaced relationship to the spindle housing for transferring tools between the spindle and the tool storage magazine; and means connecting the tool storage magazine and the tool transfer mechanism to the vertical slide such that the tool storage magazine and the tool transfer mechanism are both supported by the vertical slide in cantilever fashion and so as to permit horizontal movement of the spindle housing with respect to the vertical slide as allows for machining operations when tools are transferred to and from the tool storage magazine.

17. The combination of claim 1, wherein the tool storage magazine comprises:

a plurality of vertical tool carriers for respectively containing the plurality of tools;

means to place a selected tool carrier in a horizontal tool transfer position wherein a new tool may be withdrawn therefrom or a used tool inserted therein; and wherein the transfer mechanism comprises:

a tool transfer arm mounted for rotation about an axis parallel to and equidistant from the axes of tools in the transfer position and the spindle; and first and second clamping means to selectively radially extend from and retract towards the transfer arm in mutually transverse directions to respectively grasp and release tools in the transfer position and the spindle.

18. The combination of claim 17, wherein the transfer mechanism further comprises:

means to outwardly and inwardly move the transfer arm in an axial manner along the axis of rotation between an inner position proximate the transfer position and the spindle and an outer position remote from the transfer position and the spindle, the outward movement serving to withdraw the new tool from the selected tool carrier or to withdraw the used tool from the spindle, and the inward movement serving to insert the new tool in the spindle or to insert the used tool in its tool carrier; and means to bidirectionally rotate the transfer arm through first, second, third and fourth index positions such that in the first and fourth index positions a tool may be withdrawn from and inserted in a tool carrier and such that in the second and third index positions a tool may be withdrawn from and inserted in the spindle.

19. The combination of claim 18, wherein the respective arcs defined between the first and second index positions and the third and fourth index positions are equal.

20. The combination of claim 19, wherein the respective arcs defined between the first and second index positions, the second and third index positions, and the third and fourth index positions are each approximately equal to a 90° angle, and wherein the transverse directions of extension and retraction of the first and second clamping means define an approximate 90° angle.

21. A method of replacing a used tool in a spindle with a new tool comprising:

placing a first tool carrier containing a first new tool at a transfer station;

moving the first tool carrier to a tool transfer position at the transfer station with the axis of the first new tool generally parallel to the axis of the spindle;

withdrawing the first new tool from the first tool carrier to an outer position axially displaced from the tool transfer position;

returning the first tool carrier to its original position at the transfer station;

returning the first new tool to the tool transfer position during machining of a workpiece by the used tool in the spindle;

removing the first tool carrier from the transfer station during the machining;

placing a tool carrier for the used tool in the spindle at the transfer station during the machining;

terminating the machining;

rotating the first new tool about an axis of rotation in a first direction from the tool transfer position to an inner intermediate position, the axis of rotation being generally parallel to and equidistant from the axis of the first new tool in the transfer position and the axis of the spindle;

withdrawing the used tool from the spindle to an aligned outer position axially displaced from that of the used tool in the spindle and simultaneously moving the first new tool from the inner intermediate position to an outer intermediate position axially displaced therefrom;

rotating the first new tool in the first direction about the axis of rotation from the outer intermediate position to the outer aligned position and simultaneously rotating the used tool in the first direction about the axis of rotation from the outer aligned position to a further outer intermediate position;

inserting the first new tool in the spindle and simultaneously moving the used tool from the further outer intermediate position to a further inner intermediate position axially displaced therefrom;

rotating the used tool in the first direction about the axis of rotation from the further inner intermediate position to the tool transfer position; and beginning machining of the workpiece by the first new tool.

22. The method of claim 2, further including:

withdrawing the used tool from the tool transfer position to the outer position axially displaced from the tool transfer position;

moving the tool carrier of the used tool to the tool transfer position at the transfer station;

inserting the used tool in its tool carrier;

returning the tool carrier of the used tool to its original position at the transfer station;

removing the tool carrier of the used tool from the transfer station;

placing a second tool carrier containing a second new tool at the transfer station;

moving the second tool carrier to the tool transfer position;

withdrawing the second new tool from the second tool carrier to the outer position axially displaced from the tool transfer position;

returning the second tool carrier to its original position at the transfer station;

returning the second new tool to the tool transfer position during machining of the workpiece by the first new tool;

removing the second tool carrier from the transfer station during the second mentioned machining;

placing the first tool carrier at the transfer station during the second mentioned machining;

terminating the second mentioned machining;

rotating the second new tool about the axis of rotation in a second direction opposite to the first direction from the tool transfer position to the further inner intermediate position;

withdrawing the first new tool from the spindle to the aligned outer position and simultaneously moving the second new tool from the further inner intermediate position to the further outer intermediate position;

rotating the second new tool in the second direction about the axis of rotation from the further outer intermediate position to the outer aligned position and simultaneously rotating the first new tool from the outer aligned position to the outer intermediate position;

inserting the second new tool in the spindle and simultaneously moving the first new tool from the outer intermediate position to the inner intermediate position;

rotating the first new tool in the second direction about the axis of rotation from the inner intermediate position to the tool transfer position; and beginning machining of the workpiece by the second new tool.

23. The method of claim 21, wherein the rotating steps each describe approximate 90° arcs.

24. The method of claim 21, further including:

searching for the first tool carrier prior to placing it at the transfer station; and searching for the tool carrier of the used tool after removing the first tool carrier from the transfer station and prior to placing the tool carrier for the used tool at the transfer station.

* * * * *